US012725394B2

(12) United States Patent
Murasawa et al.

(10) Patent No.: US 12,725,394 B2
(45) Date of Patent: Sep. 1, 2026

(54) IMAGE PROCESSING APPARATUS, IMAGE PROCESSING METHOD, AND NON-TRANSITORY COMPUTER-READABLE STORAGE MEDIUM STORING PROGRAM THAT GENERATE IMAGE DATA HAVING UNDERGONE COLOR GAMUT CONVERSION FROM INPUT DATA

(71) Applicant: CANON KABUSHIKI KAISHA, Tokyo (JP)

(72) Inventors: Kouta Murasawa, Kanagawa (JP); Takashi Nakamura, Kanagawa (JP); Hidetsugu Kagawa, Kanagawa (JP); Akihiko Nakatani, Kanagawa (JP); Akitoshi Yamada, Kanagawa (JP); Kentaro Yano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 416 days.

(21) Appl. No.: 18/340,724

(22) Filed: Jun. 23, 2023

(65) Prior Publication Data

US 2024/0013507 A1 Jan. 11, 2024

(30) Foreign Application Priority Data

Jul. 7, 2022 (JP) ................................ 2022-109986

(51) Int. Cl.

| | |
|---|---|
| ***G06K 9/32*** | (2006.01) |
| ***G06T 7/90*** | (2017.01) |

(Continued)

(52) U.S. Cl.

CPC ................ *G06V 10/56* (2022.01); *G06T 7/90* (2017.01); *G06V 10/60* (2022.01); *G06V 10/761* (2022.01); *G06T 2207/10024* (2013.01)

(58) Field of Classification Search

CPC ...... G06V 10/56; G06V 10/60; G06V 10/761; G06T 7/90; G06T 2207/10024;

(Continued)

(56) References Cited

U.S. PATENT DOCUMENTS

| | | | | |
|---|---|---|---|---|
| 6,016,359 | A | 1/2000 | Komatsu | H04N 1/60 |
| 7,116,441 | B1 | 10/2006 | Matsuoka | 358/1.9 |

(Continued)

FOREIGN PATENT DOCUMENTS

| | | |
|---|---|---|
| EP | 0961488 | 12/1999 |
| EP | 1022897 | 7/2000 |

(Continued)

OTHER PUBLICATIONS

Extended European Search Report dated Dec. 5, 2023 in counterpart EP Application No. 23182142.2.

(Continued)

*Primary Examiner* — Duy M Dang

(74) *Attorney, Agent, or Firm* — Venable LLP

(57) ABSTRACT

An image processing apparatus including a generation unit to generate image data having undergone color gamut conversion from input image data using conversion data for converting from a color gamut of the input image data into a color gamut of an output device and a correction unit to correct first conversion data to second conversion data based on a result of the color gamut conversion of using the first conversion data by the generation unit, The generation unit generates the image data using the second conversion data, first output data generated as a result of the color gamut conversion using the first conversion data from first image data including a first color and a second color, includes a third color corresponding to the first color and a fourth color (Continued)

corresponding to the second color, a fifth color corresponding to the first color and a sixth color corresponding to the second.

24 Claims, 13 Drawing Sheets

(51) Int. Cl.
*G06V 10/56* (2022.01)
*G06V 10/60* (2022.01)
*G06V 10/74* (2022.01)

(58) Field of Classification Search
CPC ...... H04N 1/6061; H04N 1/60; H04N 1/6005; H04N 1/6008
See application file for complete search history.

(56) References Cited

U.S. PATENT DOCUMENTS

| | | | | |
|---|---|---|---|---|
| 7,342,684 | B2 | 3/2008 | Imafuku et al. | |
| 7,636,178 | B2 | 12/2009 | Nakatani et al. | |
| 7,688,489 | B2 | 3/2010 | Nagoshi et al. | |
| 7,869,092 | B2 | 1/2011 | Nakatani et al. | |
| 7,912,280 | B2 | 3/2011 | Miyagi et al. | |
| 8,139,849 | B2 | 3/2012 | Miyagi et al. | |
| 8,179,567 | B2 | 5/2012 | Nakamura | |
| 8,310,723 | B2 | 11/2012 | Nakatani et al. | |
| 8,508,794 | B2 | 8/2013 | Nakatani | |
| 8,616,668 | B2 | 12/2013 | Saito et al. | |
| 8,899,715 | B2 | 12/2014 | Saito et al. | |
| 8,953,234 | B2 | 2/2015 | Iguchi et al. | |
| 9,055,252 | B2 | 6/2015 | Miyake et al. | |
| 9,111,204 | B2 | 8/2015 | Fujita et al. | |
| 9,162,477 | B2 | 10/2015 | Ikeda et al. | |
| 9,623,671 | B2 | 4/2017 | Yamada et al. | |
| 9,692,944 | B2 | 6/2017 | Goto et al. | |
| 9,694,598 | B2 | 7/2017 | Ishikawa et al. | |
| 10,022,983 | B2 | 7/2018 | Yamada et al. | |
| 10,748,246 | B2 | 8/2020 | Hashii et al. | |
| 10,764,472 | B2 | 9/2020 | Yamashita | H04N 1/60 |
| 11,323,576 | B2 | 5/2022 | Kagawa et al. | |
| 11,412,107 | B2 | 8/2022 | Tsuchiya et al. | |
| 2012/0218572 | A1* | 8/2012 | Kishino | H04N 1/6066 358/1.9 |
| 2017/0163851 | A1* | 6/2017 | Yamada | H04N 1/60 |
| 2022/0253655 | A1 | 8/2022 | Abe et al. | |
| 2022/0358777 | A1 | 11/2022 | Mizoguchi et al. | |
| 2023/0124689 | A1 | 4/2023 | Yamada et al. | |

FOREIGN PATENT DOCUMENTS

| | | |
|---|---|---|
| JP | H07-203234 | 8/1995 |
| JP | 4622900 B2 | 2/2011 |
| JP | 2020-027948 | 2/2020 |

OTHER PUBLICATIONS

U.S. Appl. No. 18/300,325, filed Apr. 13, 2023.
U.S. Appl. No. 18/465,126, filed Sep. 11, 2023.
Extended European Search Report issued Dec. 17, 2025, in corresponding European Application No. 25198785.5 (8 pages).

* cited by examiner

FIG. 7
AFTER CORRECTION L
L610
L607
L611
L606
L607
L605
BEFORE CORRECTION L

ORIGINAL

IMAGE PROCESSING APPARATUS, IMAGE PROCESSING METHOD, AND NON-TRANSITORY COMPUTER-READABLE STORAGE MEDIUM STORING PROGRAM THAT GENERATE IMAGE DATA HAVING UNDERGONE COLOR GAMUT CONVERSION FROM INPUT DATA

BACKGROUND OF THE INVENTION

Cross Reference to Priority Application

This application claims the benefit of Japanese Patent Application No. 2022-109986, filed Jul. 7, 2022, which is hereby incorporated by reference herein in its entirety.

FIELD OF THE INVENTION

The present invention relates to an image processing apparatus capable of executing color mapping, an image processing method, and a non-transitory computer-readable storage medium storing a program.

DESCRIPTION OF THE RELATED ART

There is known an image processing apparatus that receives a digital original described in a predetermined color space, performs, for each color in the color space, mapping to a color gamut that can be reproduced by a printer, and outputs the original. Japanese Patent Laid-Open No. 2020-27948 describes "perceptual" mapping and "absolute colorimetric" mapping. In addition, Japanese Patent Laid-Open No. 07-203234 describes deciding the presence/absence of color space compression and the compression direction for an input color image signal.

SUMMARY OF THE INVENTION

The present invention provides an image processing apparatus for implementing mapping for effectively reducing color degeneration, an image processing method, and a non-transitory computer-readable storage medium storing a program.

The present invention in one aspect provides an image processing apparatus comprising an input unit configured to input image data, a generation unit configured to generate image data having undergone color gamut conversion from the image data input by the input unit using a conversion unit configured to convert a color gamut of the image data input by the input unit into a color gamut of a device configured to output the image data, and a correction unit configured to correct the conversion unit based on a result of the color gamut conversion, wherein, in a case when the correction unit corrects the conversion unit, the generation unit generates image data having undergone color gamut conversion from the image data input by the input unit using the corrected conversion unit, and, in the image data having undergone the color gamut conversion by the corrected conversion unit, a color difference in the image data having undergone the color gamut conversion by the conversion unit is expanded.

According to the present invention, it is possible to effectively reduce color degeneration.

Further features of the present invention will become apparent from the following description of exemplary embodiments with reference to the attached drawings.

DESCRIPTION OF THE EMBODIMENTS

Figure 1:
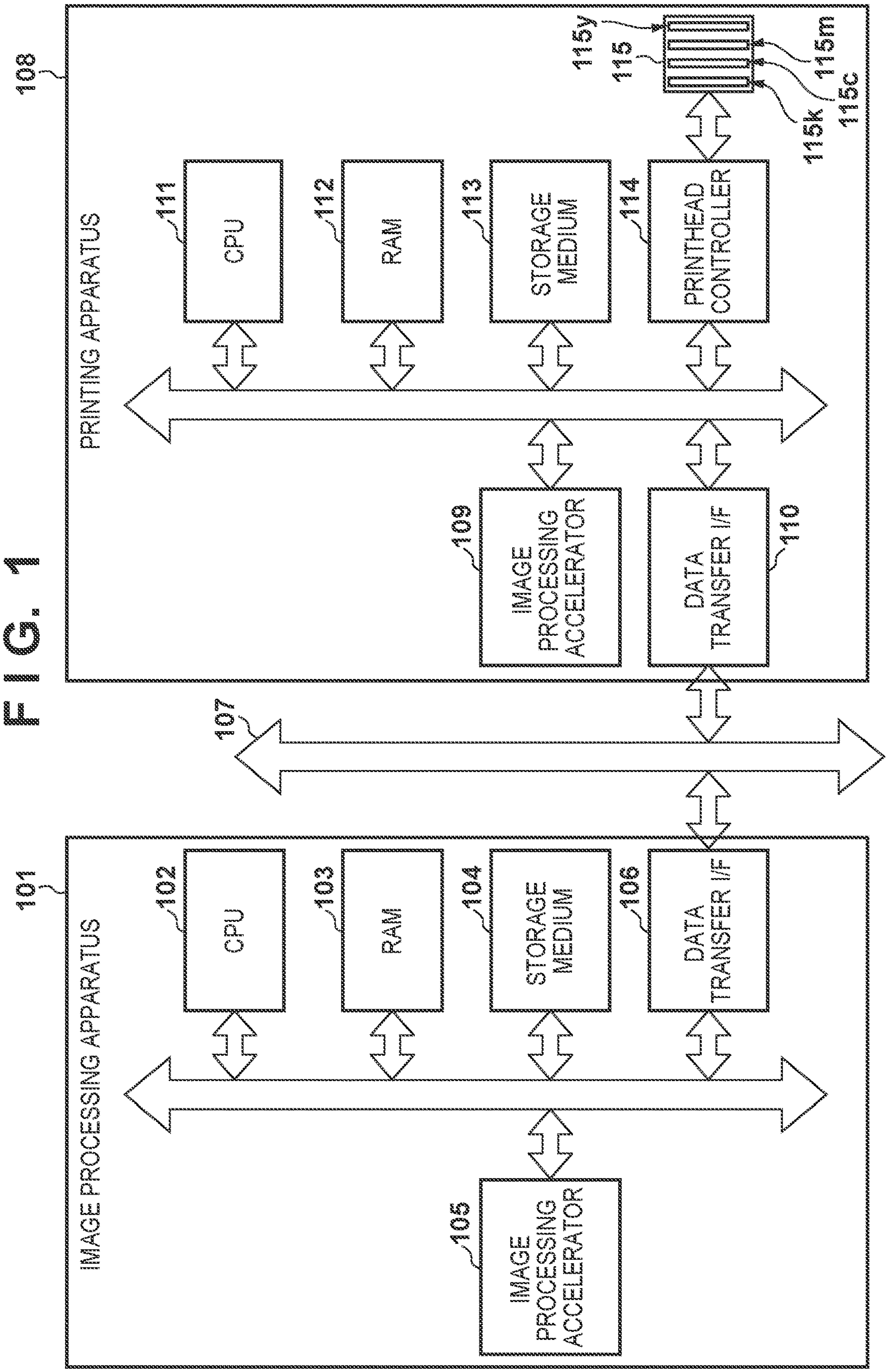
FIG. 1 is a block diagram showing the arrangement of an image processing apparatus.

Hereafter, embodiments will be described in detail with reference to the attached drawings. Note, the following embodiments are not intended to limit the scope of the claimed invention. Multiple features are described in the embodiments, but a limitation is not made to an invention that requires all such features, and multiple such features may be combined as appropriate. Furthermore, in the attached drawings, the same reference numerals are given to the same or similar configurations, and a redundant description thereof is omitted.

If mapping to a color gamut that can be reproduced by a device is performed for a plurality of colors outside the color gamut that can be reproduced by the device, the mapping may cause color degeneration. A mechanism for implementing mapping for effectively reducing color degeneration is required.

According to the present disclosure, it is possible to effectively reduce color degeneration.

First Embodiment

Terms used in this specification are defined in advance, as follows.

(Color Reproduction Region)

"Color reproduction region" is also called a color reproduction range, a color gamut, or a gamut. Generally, "color reproduction region" indicates the range of colors that can be reproduced in an arbitrary color space. In addition, a gamut volume is an index representing the extent of this color reproduction range. The gamut volume is a three-dimensional volume in an arbitrary color space. Chromaticity points forming the color reproduction range are sometimes discrete. For example, a specific color reproduction range is represented by 729 points on CIE-L*a*b*, and points between them are obtained by using a well-known interpolating operation such as tetrahedral interpolation or cubic interpolation. In this case, as the corresponding gamut volume, it is possible to use a volume obtained by calculating the volumes on CIE-L*a*b* of tetrahedrons or cubes forming the color reproduction range and accumulating the calculated volumes, in accordance with the interpolating operation method. The color reproduction region and the color gamut in this embodiment are not limited to a specific color space. In this embodiment, however, a color reproduction region in the CIE-L*a*b* space will be explained as an example. Furthermore, the numerical value of a color reproduction region in this embodiment indicates a volume obtained by accumulation in the CIE-L*a*b* space on the premise of tetrahedral interpolation.

(Gamut Mapping)

Gamut mapping is processing of performing conversion between different color gamuts, and is, for example, mapping of an input color gamut to an output color gamut of a device such as a printer. Perceptual, Saturation, Colorimetric, and the like, of the ICC profile are general. The mapping processing may be implemented by, for example, conversion by a three-dimensional lookup table (3DLUT). Furthermore, the mapping processing may be performed after conversion of a color space into a standard color space. For example, if an input color space is sRGB, conversion into the CIE-L*a*b* color space is performed and then the mapping processing to an output color gamut is performed on the CIE-L*a*b* color space. The mapping processing may be conversion by a 3DLUT, or may be performed using a conversion formula. Conversion between the input color space and the output color space may be performed simultaneously. For example, the input color space may be the sRGB color space, and conversion into RGB values or CMYK values unique to a printer may be performed at the time of output.

(Original Data)

Original data indicates whole input digital data as a processing target. The original data includes one to a plurality of pages. Each single page may be held as image data or may be represented as a drawing command. If a page is represented as a drawing command, the page may be rendered and converted into image data, and then processing may be performed. The image data is formed by a plurality of pixels that are two-dimensionally arranged. Each pixel holds information indicating a color in a color space. Examples of the information indicating a color are, for example, RGB values, CMYK values, a K value, CIE-L*a*b* values, HSV values, and HLS values.

(Color Degeneration)

In this embodiment, the fact that when performing gamut mapping for arbitrary two colors, the distance between the colors after mapping in a predetermined color space is less than the distance between the colors before mapping is defined as color degeneration. More specifically, assume that there are a color A and a color B in a digital original, and mapping to the color gamut of a printer is performed to convert the color A into a color C and the color B into a color D. In this case, the fact that the distance between the colors C and D is less than the distance between the colors A and B is defined as color degeneration. If color degeneration occurs, colors that are recognized as different colors in the digital original are recognized as identical colors when the original is printed. For example, in a graph, different items have different colors, thereby recognizing the different items. If color degeneration occurs, different colors may be recognized as identical colors, and thus different items of a graph may erroneously be recognized as identical items. The predetermined color space in which the distance between the colors is calculated may be an arbitrary color space. Examples of the color space are the sRGB color space, the Adobe RGB color space, the CIE-L*a*b* color space, the CIE-LUV color space, the XYZ color space, the xyY color space, the HSV color space, and HLS color space.

FIG. 1 is a block diagram showing an example of the arrangement of an image processing apparatus according to this embodiment. As an image processing apparatus 101, for example, a PC, a tablet, a server, or a printing apparatus is used. FIG. 1 shows an example in which the image processing apparatus 101 is configured separately from a printing apparatus 108. A CPU 102 executes various kinds of image processes by reading out programs stored in a storage medium 104 such as an HDD or ROM to a RAM 103 as a work area and executing the readout programs. For example, the CPU 102 acquires a command from the user via a Human Interface Device (HID) I/F (not shown). Then, the CPU 102 executes various kinds of image processes in accordance with the acquired command and the programs stored in the storage medium 104. Furthermore, the CPU 102 performs predetermined processing for original data acquired via a data transfer I/F 106 in accordance with the program stored in the storage medium 104. The CPU 102 displays the result and various kinds of information on a display (not shown), and transmits them via the data transfer I/F 106.

An image processing accelerator 105 is hardware capable of executing image processing faster than the CPU 102. The image processing accelerator 105 is activated when the CPU 102 writes a parameter and data necessary for image processing at a predetermined address of the RAM 103. The image processing accelerator 105 loads the above-described parameter and data, and then executes the image processing for the data. Note that the image processing accelerator 105 is not an essential element, and the CPU 102 may execute equivalent processing. More specifically, the image processing accelerator is a GPU or an exclusively designed electric circuit. The above-described parameter can be stored in the storage medium 104 or can be externally acquired via the data transfer I/F 106.

In the printing apparatus 108, a CPU 111 reads out a program stored in a storage medium 113 to a RAM 112 as a work area and executes the readout program, thereby comprehensively controlling the printing apparatus 108. An image processing accelerator 109 is hardware capable of executing image processing faster than the CPU 111. The image processing accelerator 109 is activated when the CPU 111 writes a parameter and data necessary for image processing at a predetermined address of the RAM 112. The image processing accelerator 109 loads the above-described parameter and data, and then executes the image processing for the data. Note that the image processing accelerator 109 is not an essential element, and the CPU 111 may execute equivalent processing. The above-described parameter can be stored in the storage medium 113, or can be stored in a storage (not shown) such as a flash memory or an HDD.

The image processing to be performed by the CPU 111 or the image processing accelerator 109 will now be explained. This image processing is, for example, processing of generating, based on acquired print data, data indicating the dot formation position of ink in each scan by a printhead 115. The CPU 111 or the image processing accelerator 109 performs color conversion processing and quantization processing for the acquired print data.

The color conversion processing is processing of performing color separation to ink concentrations to be used in the printing apparatus 108. For example, the acquired print data contains image data indicating an image. In a case when the image data is data indicating an image in a color space coordinate system such as sRGB as the expression colors of a monitor, data indicating an image by color coordinates (R, G, B) of the sRGB is converted into ink data (CMYK) to be handled by the printing apparatus 108. The color conversion method is implemented by, for example, matrix operation processing or processing using a 3DLUT or 4DLUT.

In this embodiment, as an example, the printing apparatus 108 uses inks of black (K), cyan (C), magenta (M), and yellow (Y) for printing. Therefore, image data of RGB signals is converted into image data formed by 8-bit color signals of K, C, M, and Y The color signal of each color corresponds to the application amount of each ink. Furthermore, the ink colors are four colors of K, C, M, and Y, as examples. However, to improve image quality, it is also possible to use other ink colors such as inks of fluorescence ink (F) and light cyan (Lc), light magenta (Lm), and gray (Gy) having low concentrations. In this case, color signals corresponding to the inks are generated.

After the color conversion processing, quantization processing is performed for the ink data. This quantization processing is processing of decreasing the number of tone levels of the ink data. In this embodiment, quantization is performed by using a dither matrix in which thresholds to be compared with the values of the ink data are arrayed in individual pixels. After the quantization processing, binary data indicating whether to form a dot in each dot formation position is finally generated.

After the image processing is performed, a printhead controller 114 transfers the binary data to the printhead 115. At the same time, the CPU 111 performs printing control via the printhead controller 114 so as to operate a carriage motor (not shown) for operating the printhead 115, and to operate a conveyance motor for conveying a print medium. The printhead 115 scans the print medium and also discharges ink droplets onto the print medium, thereby forming an image.

The image processing apparatus 101 and the printing apparatus 108 are connected to each other via a communication line 107. In this embodiment, a Local Area Network (LAN) will be explained as an example of the communication line 107. However, the connection may also be obtained by using, for example, a USB hub, a wireless communication network using a wireless access point, or a Wifi direct communication function.

A description will be provided below by assuming that the printhead 115 has nozzle arrays for four color inks of cyan (C), magenta (M), yellow (Y), and black (K).

Figure 14:
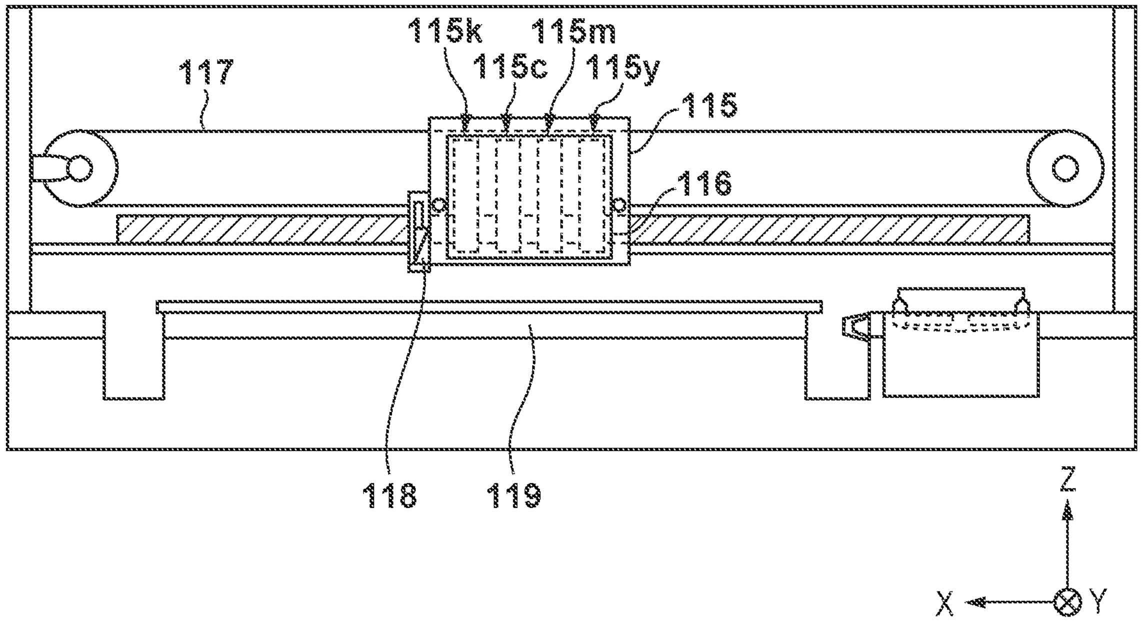
FIG. 14 is a view showing an arrangement on the periphery of a printhead.

FIG. 14 is a view for explaining the printhead 115 according to this embodiment. In this embodiment, an image is printed on a unit area for one nozzle array by N scans. The printhead 115 includes a carriage 116, nozzle arrays 115*k*, 115*c*, 115*m*, and 115*y*, and an optical sensor 118. The carriage 116 on which the four nozzle arrays 115*k*, 115*c*, 115*m*, and 115*y* and the optical sensor 118 are mounted can reciprocally move along the X direction (a main scan direction) in FIG. 14 by the driving force of a carriage motor transmitted via a belt 117. While the carriage 116 moves in the X direction relative to a print medium, ink droplets are discharged from each nozzle of the nozzle arrays in the gravity direction (the −Z direction in FIG. 14) based on print data. Consequently, an image is printed by 1/N of a main scan on the print medium placed on a platen 119. Upon completion of one main scan, the print medium is conveyed along a conveyance direction (the −Y direction in FIG. 14) crossing the main scan direction by a distance corresponding to the width of 1/N of the main scan. These operations print an image having the width of one nozzle array by N scans. An image is gradually formed on the print medium by alternately repeating the main scan and the conveyance operation, as described above. In this way, control is executed to complete image printing in a predetermined area.

Figure 2:
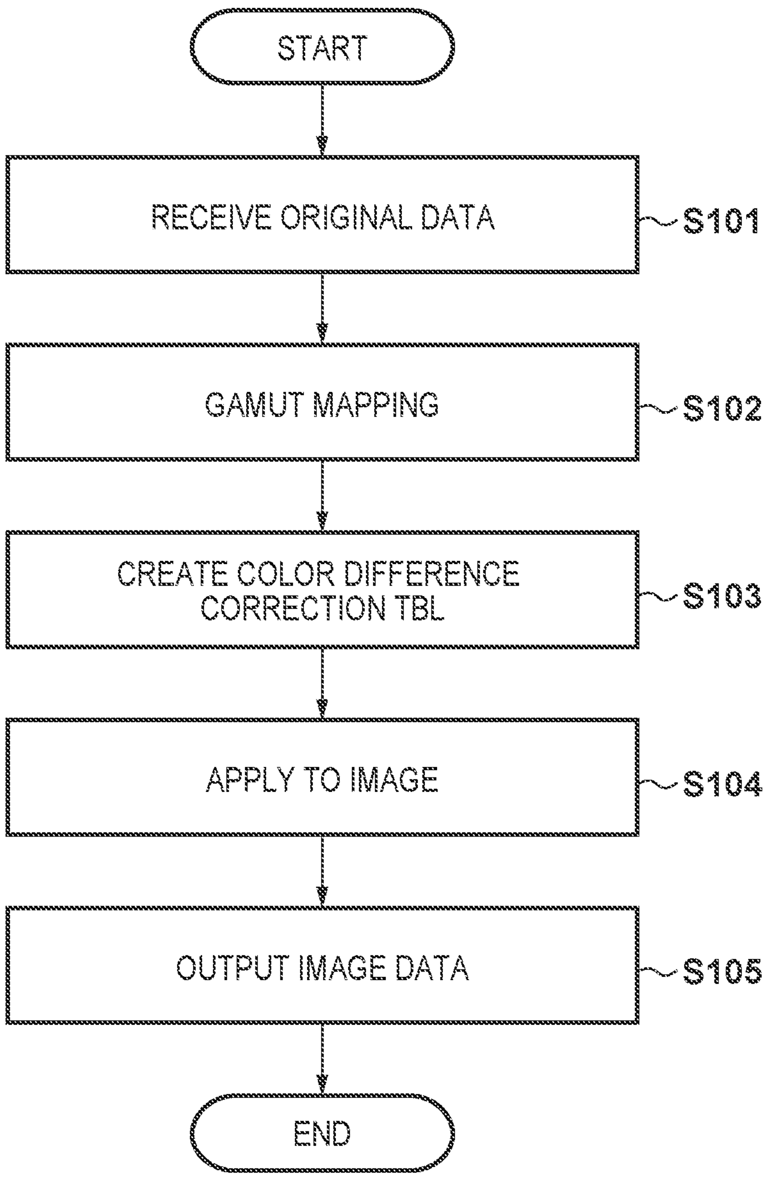
FIG. 2 is a flowchart illustrating image processing.

FIG. 2 is a flowchart illustrating the image processing of the image processing apparatus 101 according to this embodiment. In this embodiment, with respect to a combination of colors subjected to color degeneration, the distance between the colors in a predetermined color space can be made large by the processing shown in FIG. 2. As a result, it is possible to reduce the degree of color degeneration. This processing shown in FIG. 2 is implemented when, for example, the CPU 102 reads out a program stored in the storage medium 104 to the RAM 103 and executes the readout program. The processing shown in FIG. 2 may be executed by the image processing accelerator 105.

In step S101, the CPU 102 receives original data. For example, the CPU 102 acquires original data stored in the storage medium 104. Alternatively, the CPU 102 may acquire original data via the data transfer I/F 106. The CPU 102 acquires image data including color information from the received original data (acquisition of color information). The image data includes values representing a color expressed in a predetermined color space. In acquisition of the color information, the values representing a color are acquired. Examples of the values representing a color are sRGB data, Adobe RGB data, CIE-L*a*b* data, CIE-LUV data, XYZ color system data, xyY color system data, HSV data, and HLS data.

In step S102, the CPU 102 performs color conversion for the image data using color conversion information stored in advance in the storage medium 104. In this embodiment, the color conversion information is a gamut mapping table, and gamut mapping is performed for the color information of each pixel of the image data. The image data obtained after gamut mapping is stored in the RAM 103 or the storage medium 104. More specifically, the gamut mapping table is a 3DLUT. By the 3DLUT, a combination of output pixel values (Rout, Gout, Bout) can be calculated with respect to a combination of input pixel values (Rin, Gin, Bin). If each of the input values Rin, Gin, and Bin has 256 tones, a table Table1[256][256][256][3] having 256×256×256=16,777,216 sets of output values in total is preferably used. The CPU 102 performs color conversion using the gamut mapping table. More specifically, color conversion is implemented by performing, for each pixel of the image formed by the RGB pixel values of the image data received in step S101, the following processing given by:

$$Rout=Table1[Rin][Gin][Bin][0] \quad (1)$$

$$Gout=Table1[Rin][Gin][Bin][1] \quad (2)$$

$$Bout=Table1[Rin][Gin][Bin][2] \quad (3)$$

The table size may be reduced by decreasing the number of grids of the LUT from 256 grids to, for example, sixteen grids and deciding output values by interpolating table values of a plurality of grids.

In step S103, using the image data received in step S101, the image data obtained after the gamut mapping in step S102, and the gamut mapping table, the CPU 102 creates a color degeneration-corrected table. The form of the color degeneration-corrected table is the similar to the form of the gamut mapping table. Step S103 will be described later.

In step S104, the CPU 102 generates corrected image data having undergone color degeneration correction by applying (performing an operation) the color degeneration-corrected table created in step S103 to the image data received in step S101. The generated color degeneration-corrected image data is stored in the RAM 103 or the storage medium 104.

In step S105, the CPU 102 outputs, via the data transfer I/F 106, the color degeneration-corrected image data generated in step S104. The gamut mapping may be mapping from the sRGB color space to the color reproduction gamut of the printing apparatus 108. In this case, it is possible to suppress color degeneration caused by the gamut mapping to the color reproduction gamut of the printing apparatus 108.

Figure 3:
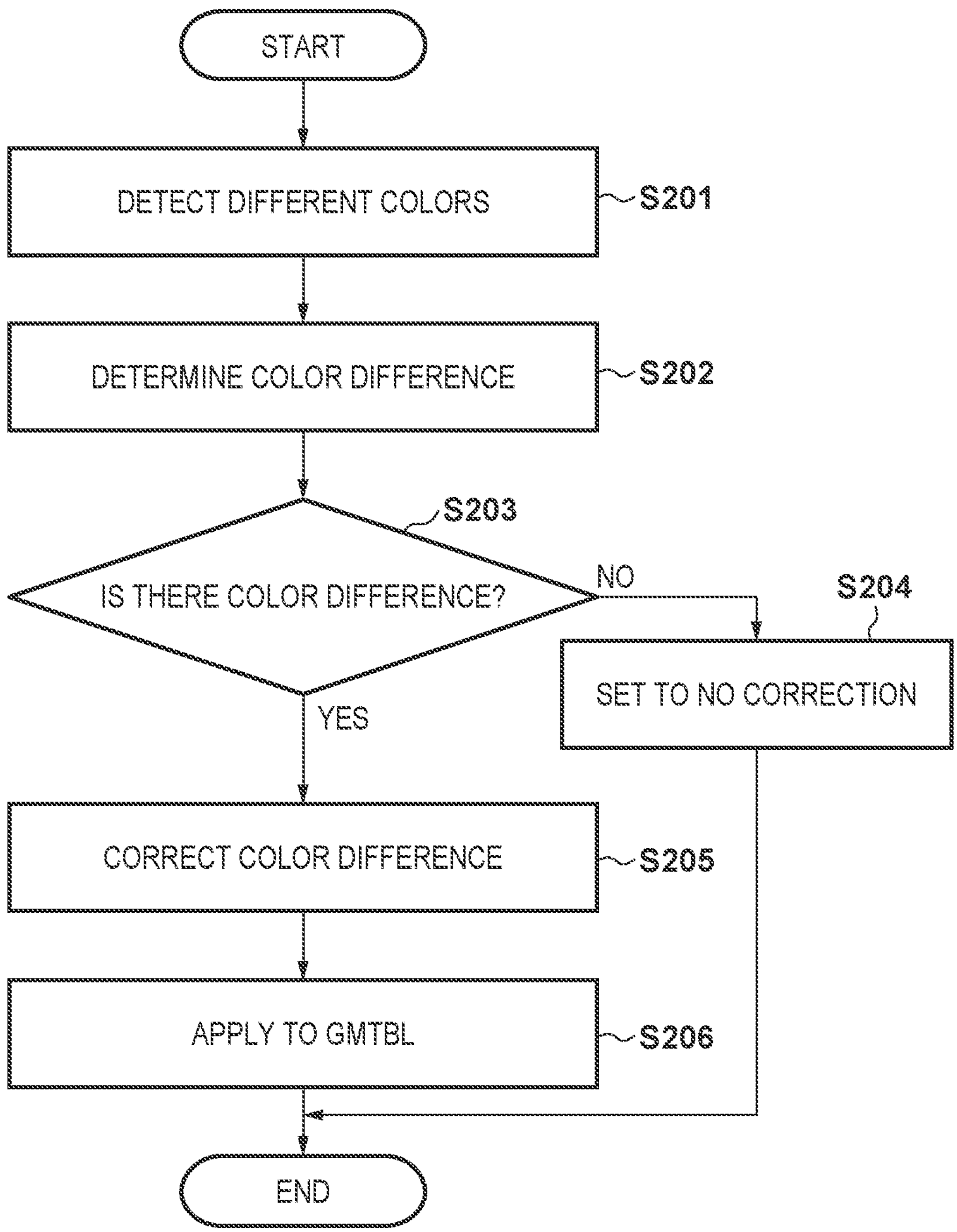
FIG. 3 is a flowchart illustrating processing of creating a color degeneration-corrected table.

The color degeneration-corrected table creation processing in step S103 will be described in detail with reference to FIG. 3. The processing shown in FIG. 3 is implemented when, for example, the CPU 102 reads out a program stored in the storage medium 104 to the RAM 103 and executes the readout program. The processing shown in FIG. 3 may be executed by the image processing accelerator 105.

In step S201, the CPU 102 detects unique colors of the image data received in step S101. In this embodiment, the term "unique color" indicates a color used in image data. For example, in a case of black text data with a white background, unique colors are white and black. Furthermore, for example, in a case of an image such as a photograph, unique colors are colors used in the photograph. The CPU 102 stores the detection result as a unique color list in the RAM 103 or the storage medium 104. The unique color list is initialized at the start of step S201. The CPU 102 repeats the detection processing for each pixel of the image data, and determines, for all the pixels included in the image data, whether the color of each pixel is different from unique colors detected until now. If it is determined that the color of the pixel is determined as a unique color, this color is stored as a unique color in the unique color list.

As a determination method, it is determined whether the color of the target pixel is a color included in the created unique color list. In a case when it is determined that the color is not included in the list, color information is newly added to the unique color list. In this way, the unique color list included in the image data can be detected. For example, if the input image data is sRGB data, each of the input values has 256 tones, and thus 256×256×256=16,777,216 unique colors in total are detected. In this case, the number of colors is enormous, thereby decreasing the processing speed. Therefore, the unique colors may be detected discretely. For example, the 256 tones may be reduced to sixteen tones, and then unique colors may be detected. If the number of colors is reduced, colors may be reduced to the colors of the closest grids. In this way, it is possible to detect 16×16×16=4,096 unique colors in total, thereby improving the processing speed.

Figure 4:
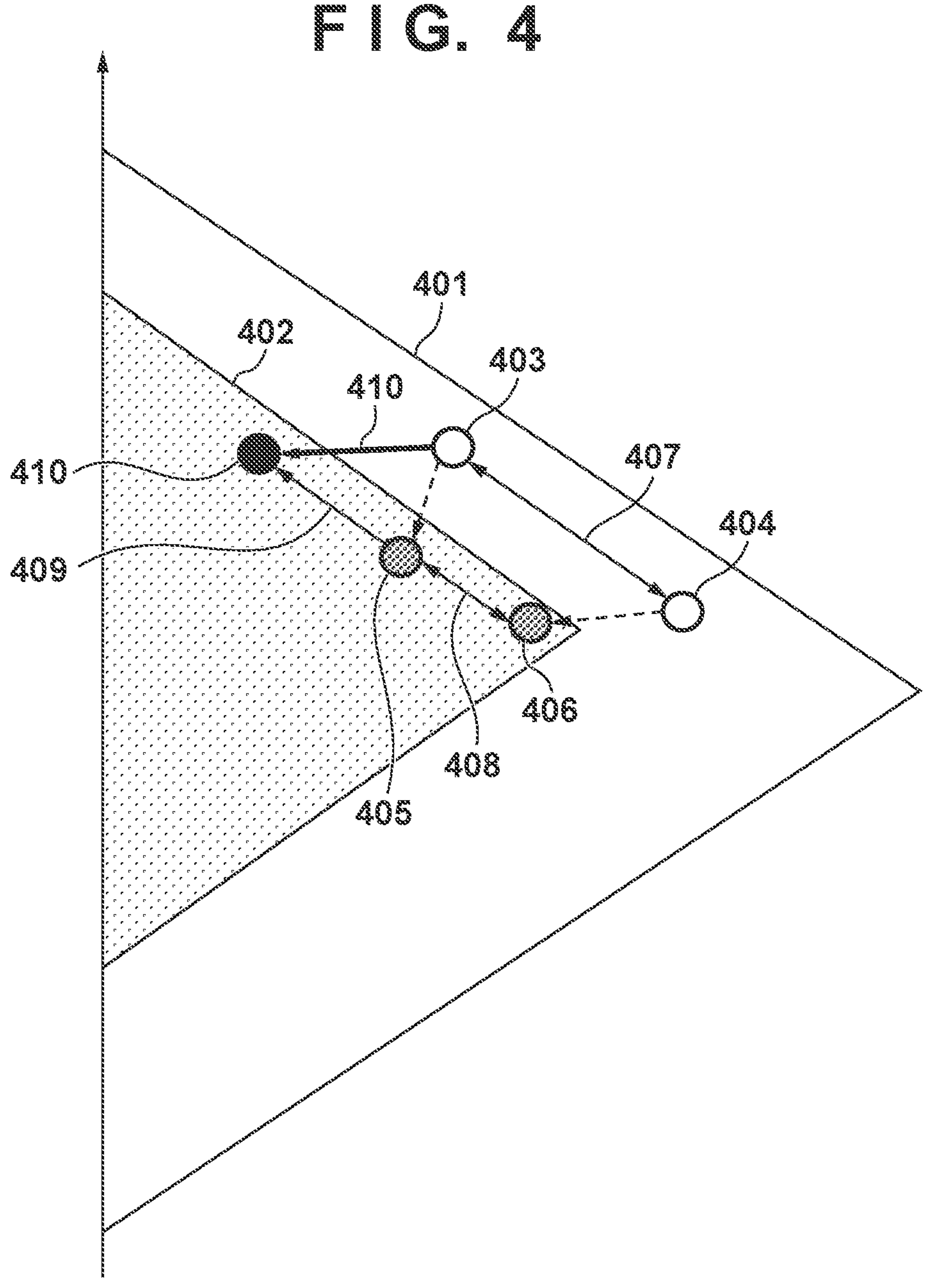
FIG. 4 is a view for explaining color degeneration.

In step S202, based on the unique color list detected in step S201, the CPU 102 detects the number of combinations of colors subjected to color degeneration, among the combinations of the unique colors included in the image data. FIG. 4 is a view for explaining color degeneration. A color gamut 401 is the color gamut of the input image data. A color gamut 402 is a color gamut after the gamut mapping in step S102. In other words, the color gamut 402 corresponds to the color gamut of the device. Colors 403 and 404 are colors included in the input image data. A color 405 is a color obtained by performing the gamut mapping for the color 403. A color 406 is a color obtained by performing the gamut mapping for the color 404. In a case when a color difference 408 between the colors 405 and 406 is less than a color difference 407 between the colors 403 and 404, it is determined that color degeneration has occurred. The CPU 102 repeats the determination processing the number of times that is equal to the number of combinations of the colors in the unique color list. As a color difference calculation method, for example, a Euclidean distance in a color space is used. In this embodiment, as a preferred example, a Euclidean distance (to be referred to as a color distance ΔE hereafter) in the CIE-L*a*b* color space is used. Since the CIE-L*a*b* color space is a visual uniform color space, the Euclidean distance can be approximated into the change amount of the color. Therefore, a person perceives that the colors become closer as the Euclidean distance on the CIE-L*a*b* color space is less and that the colors are farther apart as the Euclidean distance is greater. The color information in the CIE-L*a*b* color space is represented in a color space with three axes of L*, a*, and b*. For example, the color 403 is represented by L403, a403, and b403. The color 404 is represented by L404, a404, and b404. The color 405 is represented by L405, a405, and b405. The color 406 is represented by L406, a406, and b406. If the input image data is represented in another color space, it is converted into the CIE-L*a*b* color space. The color difference ΔE 407 and the color difference ΔE 408 are calculated by:

$$\Delta E_{407}=\sqrt{(L_{403}-L_{404})^2+(a_{403}-a_{404})^2+(b_{403}-b_{404})^2} \quad (4)$$

$$\Delta E_{408}=\sqrt{(L_{405}-L_{406})^2+(a_{405}-a_{406})^2+(b_{405}-b_{406})^2} \quad (5)$$

In a case when the color difference ΔE 408 is smaller than the color difference ΔE 407, the CPU 102 determines that color degeneration has occurred. Furthermore, in a case when the color difference ΔE 408 does not have such magnitude that a color difference can be identified, the CPU 102 determines that color degeneration has occurred. This is because if there is such color difference between the colors 405 and 406 that the colors can be identified as different colors based on the human visual characteristic, it is unnecessary to correct the color difference. In terms of the visual characteristic, for example, a predetermined value of 2.0 may be used as the color difference ΔE with which the colors can be identified as different colors. That is, in a case when the color difference ΔE 408 is less than the color difference ΔE 407 and is less than 2.0, it may be determined that color degeneration has occurred.

In step S203, the CPU 102 determines whether the number of combinations of colors that have been determined in step S202 to be subjected to color degeneration is zero. If it is determined that the number of combinations of colors that have been determined to be subjected to color degeneration is zero, the process advances to step S204, and the CPU 102 determines that the image data requires no color degeneration correction, thereby ending the processing shown in FIGS. 3 and 2. After that, the CPU 102 outputs, via the data transfer I/F 106, the image data having undergone the gamut mapping in step S102. On the other hand, if it is determined in step S203 that the number of combinations of colors that have been determined to be subjected to color degeneration is not zero, the process advances to step S205, and color degeneration correction (color difference correction) is performed.

Since color degeneration correction changes the colors, the combinations of colors not subjected to color degeneration are also changed, which is unnecessary. Therefore, based on, for example, a ratio between the total number of combinations of the unique colors and the number of combinations of the colors subjected to color degeneration, it may be determined whether color degeneration correction is necessary. More specifically, in a case when the majority of all the combinations of the unique colors are combinations of the colors subjected to color degeneration, it may be determined that color degeneration correction is necessary. This can suppress a color change caused by excessive color degeneration correction.

In step S205, based on the input image data, the image data having undergone the gamut mapping, and the gamut mapping table, the CPU 102 performs color degeneration correction for the combinations of the colors subjected to color degeneration.

Color degeneration correction will be described in detail with reference to FIG. 4. The colors 403 and 404 are input colors included in the input image data. The color 405 is a color obtained after performing color conversion for the color 403 by the gamut mapping. The color 406 is a color obtained after performing color conversion for the color 404 by the gamut mapping. Referring to FIG. 4, the combination of the colors 403 and 404 represents color degeneration. The distance between the colors 405 and 406 on the predetermined color space is increased, thereby correcting color degeneration. More specifically, correction processing is performed to increase the distance between the colors 405 and 406 to a distance equal to or greater than the distance with which the colors can be identified as different colors based on the human visual characteristic. In terms of the visual characteristic, as the distance between the colors with which the colors can be identified as different colors, the color difference ΔE is set to 2.0 or more. More preferably, the color difference between the colors 405 and 406 is desirably equal to the color difference ΔE 407. The CPU 102 repeats the color degeneration correction processing the number of times that is equal to the number of combinations of the colors subjected to color degeneration. As a result of performing color degeneration correction the number of times that is equal to the number of combinations of the colors, the color information before correction and color information after correction are held in a table. In FIG. 4, the color information is color information in the CIE-L*a*b* color space. Therefore, the input image data may be converted into the color space of the image data at the time of output. In this case, color information before correction in the color space of the input image data and color information after correction in the color space of the output image data are held in a table.

Next, the color degeneration correction processing will be described in detail. A color difference correction amount 409 that increases the color difference ΔE is obtained from the color difference ΔE 408. In terms of the visual characteristic, the difference between the color difference ΔE 408 and 2.0, which is the color difference ΔE with which the colors can be recognized as different colors is the color difference correction amount 409. More preferably, the difference between the color difference ΔE 407 and the color difference ΔE 408 is the color difference correction amount 409. As a result of correcting the color 405 by the color difference correction amount 409 on an extension from the color 406 to the color 405 in the CIE-L*a*b color space, a color 410 is obtained. The color 410 is separated from the color 406 by a color difference obtained by adding the color difference ΔE 408 and the color difference correction amount 409. The color 410 is on the extension from the color 406 to the color 405 but this embodiment is not limited to this. As long as the color difference ΔE between the colors 406 and 410 is equal to the color difference obtained by adding the color difference ΔE 408 and the color difference correction amount 409, the direction can be any of the lightness direction, the chroma direction, and the hue angle direction in the CIE-L*a*b* color space. Not only one direction, but also any combination of the lightness direction, the chroma direction, and the hue angle direction may be used. Furthermore, in the above example, color degeneration is corrected by changing the color 405 but the color 406 may be changed. Alternatively, both the colors 405 and 406 may be changed. If the color 406 is changed, the color 406 cannot be changed outside the color gamut 402, and thus the color 406 is moved and changed on the boundary surface of the color gamut 402. In this case, with respect to the shortage of the color difference ΔE, color degeneration correction may be performed by changing the color 405.

In step S206, the CPU 102 changes the gamut mapping table using the result of the color degeneration correction processing in step S205. The gamut mapping table before the change is a table for converting the color 403 as an input color into the color 405 as an output color. In accordance with the result of step S205, the table is changed to a table for converting the color 403 as an input color into the color 410 as an output color. In this way, the color degeneration-corrected table can be created. The CPU 102 repeats the processing of changing the gamut mapping table the number of times that is equal to the number of combinations of the colors subjected to color degeneration. The gamut mapping table in this embodiment is a table for calculating a combination of output pixel values (Rout, Gout, Bout) for a combination of input pixel values (Rin, Gin, Bin). Therefore, the output color of the gamut mapping table should be changed so that the color 405 of the output color becomes the output pixel value for the combination of the color 403 which is the input color. However, the output color 405 is expressed in the CIE-L*a*b* color space, and is not the output value (R, G, B) of the gamut mapping table. Therefore, it is necessary to convert from the CIE-L*a*b* color space to the output values of the gamut mapping table. In this embodiment, colorimetry is performed by printing the output pixel values of the gamut mapping table in advance. Then, a table is created in which the L*a*b* values and the output pixel values are associated with each other. The created correspondence table between the L*a*b* values and the output pixel values is held in the RAM 103 or the storage medium 104 in advance. When changing the gamut mapping table in S206, the CPU 102 uses a prestored table in which the L*a*b* values and the output pixel values are associated with each other to obtain the L*a values of the color 405 of the output color. Convert *b* values to output pixel values in the gamut mapping table. Then, the converted output pixel value is changed to become the output pixel value of the gamut mapping table. By doing so, the color 405 of the output color can be changed as the output pixel value of the gamut mapping table. The color 410 of the output color performs similar processing.

As described above, by applying the color degeneration-corrected gamut mapping table to the input image data, it is possible to perform correction of increasing the distance between the colors for each of the combinations of the colors subjected to color degeneration, among the combinations of the unique colors included in the input image data. As a result, it is possible to efficiently reduce color degeneration with respect to the combinations of the colors subjected to color degeneration. For example, assume that if the input image data is sRGB data, the gamut mapping table is created on the premise that the input image data has 16,777,216 colors. The gamut mapping table created on this premise is created in consideration of color degeneration and chroma even for colors not actually included in the input image data. In this embodiment, it is possible to adaptively correct the gamut mapping table with respect to the input image data by detecting the colors of the input image data. Then, it is possible to create the gamut mapping table for the colors of the input image data. As a result, it is possible to perform preferred adaptive gamut mapping for the input image data, thereby efficiently reducing color degeneration.

In this embodiment, the processing in a case when the input image data includes one page has been explained. The input image data may include a plurality of pages. If the input image data includes a plurality of pages, the processing procedure shown in FIG. 2 may be performed for all the pages or the processing shown in FIG. 2 may be performed for each page. As described above, even if the input image data includes a plurality of pages, it is possible to reduce the degree of color degeneration caused by gamut mapping.

In this embodiment, the color degeneration-corrected gamut mapping table is applied to the input image data, but a correction table for performing color degeneration correction for the image data having undergone gamut mapping may be created. In this case, based on the result of the color degeneration correction processing in step S205, a correction table for converting color information before correction into color information after correction may be generated. The generated correction table is a table for converting the color 405 into the color 410 in FIG. 4. In step S105, the CPU 102 applies the generated correction table to the image data having undergone the gamut mapping. As described above, it is possible to reduce, by correcting the image data having undergone the gamut mapping, the degree of color degeneration caused by the gamut mapping.

Figure 15:
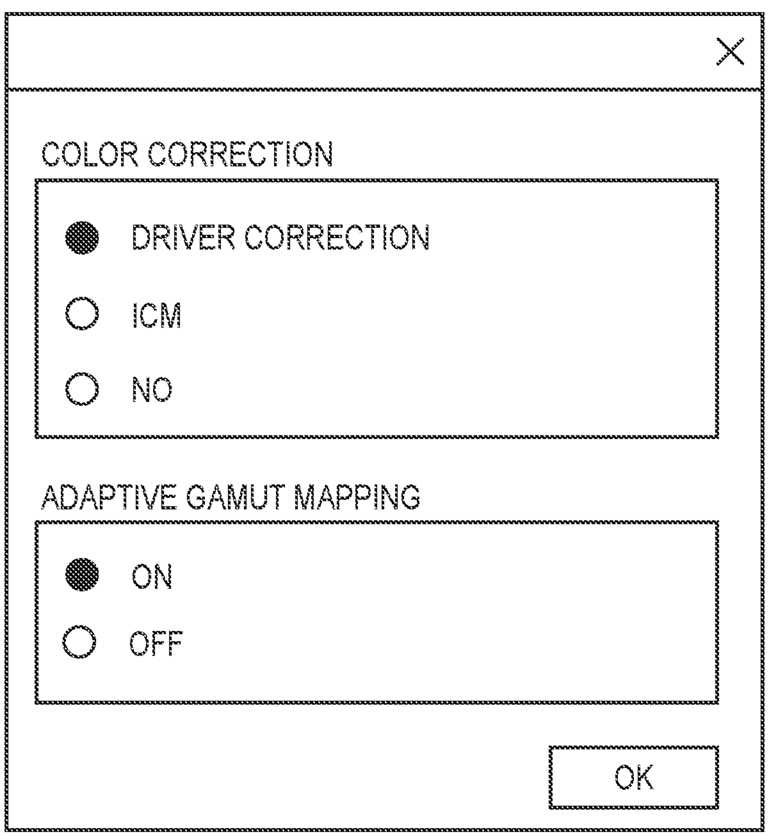
FIG. 15 is a view showing a UI screen.

In this embodiment, the user may be able to input an instruction indicating whether to execute the color degeneration correction processing. In this case, a UI screen shown in FIG. 15 may be displayed on a display unit (not shown) mounted on the image processing apparatus 101 or the printing apparatus 108, thereby making it possible to accept a user instruction. On the UI screen shown in FIG. 15, it is possible to prompt the user to select a color correction type by a toggle button. Furthermore, it is possible to prompt the user to select, by a toggle button, ON/OFF of whether to execute "adaptive gamut mapping" indicating the processing described in this embodiment. With this arrangement, it is possible to switch, in accordance with the user instruction, whether to execute adaptive gamut mapping. As a result, when the user wants to reduce the degree of color degeneration, the gamut mapping described in this embodiment can be executed.

Second Embodiment

The second embodiment will be described below concerning points different from the first embodiment. The first embodiment has explained that color degeneration correction is performed for a single color. Therefore, depending on combinations of colors of the input image data, a tint may change while reducing the degree of color degeneration. More specifically, if color degeneration correction is performed for two colors having different hue angles, and the color is changed by changing the hue angle, a tint is different from the tint of the color in the input image data. For example, if color degeneration correction is performed for blue and purple by changing a hue angle, purple is changed into red. If a tint changes, this may cause the user to recall a failure of an apparatus such as an ink discharge failure.

Furthermore, in the first embodiment, color degeneration correction is repeated the number of times that is equal to the number of combinations of the unique colors of the input image data. Therefore, the distance between the colors can be increased reliably. However, if the number of unique colors of the input image data increases, as a result of changing the color to increase the distance between the colors, the distance between the changed color and another unique color may be decreased. To cope with this, the CPU 102 needs to repeatedly execute color degeneration correction in step S205 so as to have expected distances between colors with respect to all the combinations of the unique colors of the input image data. Since the amount of processing of increasing the distance between colors is enormous, the processing time increases.

To cope with this, in this embodiment, color degeneration correction is performed in the same direction for every predetermined hue angle by setting a plurality of unique colors as one color group. To perform correction by setting a plurality of unique colors as one color group, in this embodiment, a unique color (to be described later) as a reference is selected from the color group. Furthermore, by limiting the correction direction to the lightness direction, it is possible to suppress a change of a tint. By performing correction in the lightness direction by setting the plurality of unique colors as one color group, it is unnecessary to perform processing for all the combinations of the colors of input image data, thereby reducing the processing time.

Figure 5:
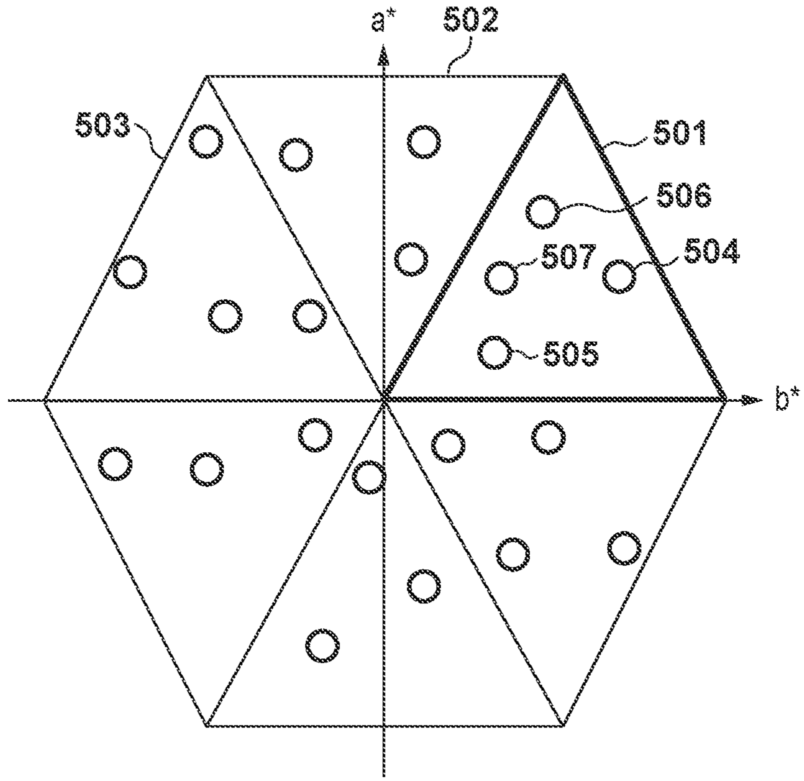
FIG. 5 is a view for explaining color degeneration determination processing in step S202.

FIG. 5 is a view for explaining color degeneration determination processing in step S202 according to this embodiment. FIG. 5 is a view showing, as a plane, two axes of the a* axis and the b* axis in the CIE-L*a*b* color space. A hue range 501 indicates a range within which a plurality of unique colors within the predetermined hue angle are set as one color group. Referring to FIG. 5, since a hue angle of 360° is divided by six, the hue range 501 indicates a range of 0° to 60°. The hue range is preferably a hue range within which colors can be recognized as identical colors. For example, the hue angle in the CIE-L*a*b* color space is decided in a unit of 30° to 60°. If the hue angle is decided in a unit of 60°, six colors of red, green, blue, cyan, magenta, and yellow can be divided. If the hue angle is decided in a unit of 30°, division is possible by a color between the colors divided in a unit of 60°. The hue range may be decided fixedly, as shown in FIG. 5. Alternatively, the hue range may be decided dynamically in accordance with the unique colors included in the input image data.

A CPU 102 detects the number of combinations of colors subjected to color degeneration, similar to the first embodiment, with respect to the combinations of the unique colors of the input image data within the hue range 501. Referring to FIG. 5, colors 504, 505, 506, and 507 indicate input colors. In this case, the CPU 102 determines whether color degeneration has occurred for combinations of the four colors 504, 505, 506, and 507. The CPU 102 repeats this processing for all the hue ranges. As described above, the number of combinations of the colors subjected to color degeneration is detected for each hue range.

In FIG. 5, for example, six is detected as the number of combinations of the colors. In this embodiment, the hue range is decided for every hue angle of 60° but the present invention is not limited to this. For example, the hue range may be decided for every hue angle of 30° or the hue range may be decided without equally dividing the angle. The hue angle range is preferably decided as a hue range so as to obtain visual uniformity. With this arrangement, colors in the same color group are visually perceived as identical colors, and thus it is possible to perform color degeneration correction for the identical colors. Furthermore, the number of combinations of the colors subjected to color degeneration may be detected for each hue range within a hue range including two adjacent hue ranges.

Figure 6:
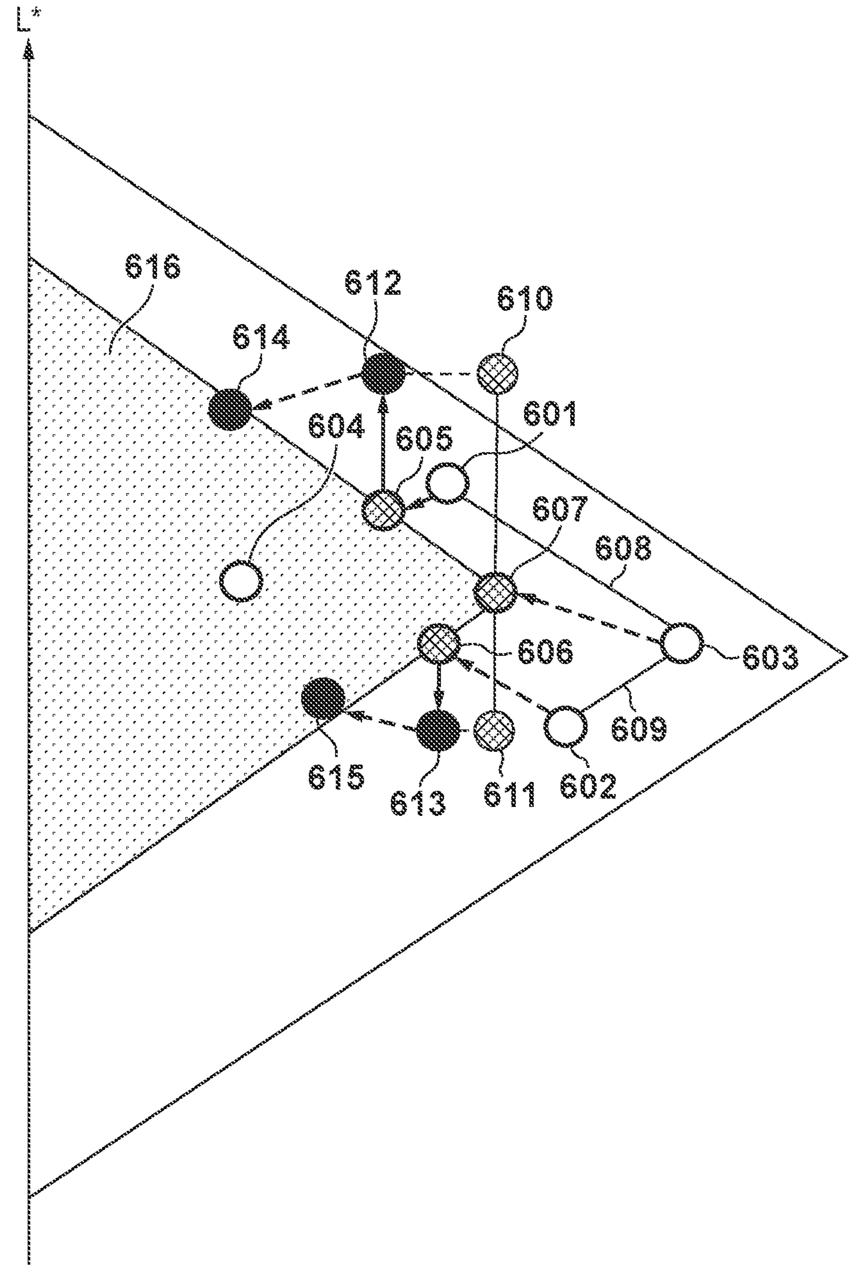
FIG. 6 is a view for explaining color degeneration correction processing in step S205.

FIG. 6 is a view for explaining the color degeneration correction processing in step S205 according to this embodiment. FIG. 6 is a view showing, as a plane, two axes of the L* axis and the C* axis in the CIE-L*a*b* color space. L* represents lightness and C* represents chroma. In FIG. 6, colors 601, 602, 603, and 604 are input colors. The colors 601, 602, 603, and 604 indicate colors included in the hue range 501 in FIG. 5. A color 605 is a color obtained after performing color conversion for the color 601 by gamut mapping. A color 606 is a color obtained after performing color conversion for the color 602 by gamut mapping. A color 607 is a color obtained after performing color conversion for the color 603 by gamut mapping. The color 604 indicates that the color obtained after performing color conversion by gamut mapping is the same color.

First, the CPU 102 decides a unique color (reference color) as the reference of the color degeneration correction processing for each hue range. In this embodiment, the maximum lightness color, the minimum lightness color, and the maximum chroma color are decided as reference colors. In FIG. 6, the color 601 is the maximum lightness color, the color 602 is the minimum lightness color, and the color 603 is the maximum chroma color.

Next, the CPU 102 calculates, for each hue range, a correction ratio R from the number of combinations of the unique colors and the number of combinations of the colors subjected to color degeneration within the target hue range. A preferred calculation formula is given by:

correction ratio $R$=number of combinations of colors subjected to color degeneration/number of combinations of unique colors The correction ratio R is lower as the number of combinations of the colors subjected to color degeneration is fewer, and is higher as the number of combinations of the colors subjected to color degeneration is greater. As described above, as the number of combinations of the colors subjected to color degeneration is greater, color degeneration correction can be performed more strongly. FIG. 6 shows an example in which there are four colors within the hue range 501 in FIG. 5. Therefore, there are six combinations of the unique colors. For example, among the six combinations, there are four combinations of the colors subjected to color degeneration. In this case, the correction ratio is 0.667. FIG. 6 shows an example in which color degeneration has occurred for all the combinations due to gamut mapping. However, even after color conversion by gamut mapping, the color difference is greater than the identifiable least color distance, the combination of the colors is not included as the combination of colors subjected to color degeneration. Thus, the combination of the colors 604 and 603 and the combination of the colors 604 and 602 are not included as the combinations of colors subjected to color degeneration. The identifiable least color difference ΔE is, for example, 2.0.

Next, the CPU 102 calculates, for each hue range, a correction amount based on the correction ratio R and pieces of color information of the maximum lightness, the minimum lightness, and the maximum chroma. The CPU 102 calculates, as correction amounts, a correction amount Mh on a side brighter than the maximum chroma color and a correction amount Ml on a side darker than the maximum chroma color. Similar to the first embodiment, the color information in the CIE-L*a*b* color space is represented in a color space with three axes of L*, a*, and b*. The color 601 as the maximum lightness color is represented by L601, a601, and b601. The color 602 as the minimum lightness color is represented by L602, a602, and b602. The color 603 as the maximum chroma color is represented by L603, a603, and b603. The preferred correction amount Mh is a value obtained by multiplying the color difference ΔE between the maximum lightness color and the maximum chroma color by the correction ratio R. The preferred correction amount Ml is a value obtained by multiplying the color difference ΔE between the maximum chroma color and the minimum lightness color by the correction ratio R. The correction amounts Mh and Ml are calculated by:

$$Mh=\sqrt{(L_{601}-L_{603})^2+(a_{601}-a_{603})^2+(b_{601}-b_{603})^2}\times R \quad (6)$$

$$Ml=\sqrt{(L_{602}-L_{603})^2+(a_{602}-a_{603})^2+(b_{602}-b_{603})^2}\times R \quad (7)$$

As described above, the color difference ΔE to be held after gamut mapping is calculated. The color difference ΔE to be held after gamut mapping is the color difference ΔE before gamut mapping. In FIG. 6, the correction amount Mh is a value obtained by multiplying a color difference 608 by the correction ratio R, and the correction amount Ml is a value obtained by multiplying a color difference ΔE 609 by the correction ratio R. Furthermore, if the color difference ΔE before gamut mapping is greater than the identifiable lowest color difference, the color difference ΔE to be held need only be larger than the identifiable smallest color difference ΔE. By performing the processing in this way, it is possible to recover the color difference ΔE, that has decreased due to gamut mapping, to the identifiable color difference ΔE. The color difference ΔE to be held may be the color difference ΔE before gamut mapping. In this case, it is possible to make identifiability close to that before gamut mapping. The color difference ΔE to be held may be greater than the color difference before gamut mapping. In this case, it is possible to improve identifiability, as compared with identifiability before gamut mapping.

Next, the CPU 102 generates a lightness correction table for each hue range. The lightness correction table is a table for expanding lightness between colors in the lightness direction based on the lightness of the maximum chroma color and the correction amounts Mh and Ml. In FIG. 6, the lightness of the maximum chroma color is lightness L603 of the color 603. The correction amount Mh is a value based on the color difference ΔE 608 and the correction ratio R. The correction amount Ml is a value based on the color difference ΔE 609 and the correction ratio R. A method of creating a lightness correction table for expanding lightness in the lightness direction will be described below.

The lightness correction table is a 1DLUT. In the 1DLUT, input lightness is lightness before correction, and output lightness is lightness after correction. The lightness after correction is decided in accordance with a characteristic based on minimum lightness after correction, the lightness of the maximum chroma color after gamut mapping, and maximum lightness after correction. The maximum lightness after correction is lightness obtained by adding the correction amount Mh to the lightness of the maximum chroma color after gamut mapping. The minimum lightness after correction is lightness obtained by subtracting the correction amount Ml from the lightness of the maximum chroma color after gamut mapping. In the lightness correction table, the relationship between the minimum lightness after correction and the lightness of the maximum chroma color after gamut mapping is defined as a characteristic that linearly changes. Furthermore, the relationship between the lightness of the maximum chroma color after gamut mapping and the maximum lightness after correction is defined as a characteristic that linearly changes. In FIG. 6, the maximum lightness before correction is lightness L605 of the color 605 as the maximum lightness color. The minimum lightness before correction is lightness L606 of the color 606 as the minimum lightness color. The lightness of the maximum chroma color after gamut mapping is lightness L607 of the color 607. The maximum lightness after correction is lightness L610 obtained by adding the color difference ΔE 608 as the correction amount Mh to the lightness L607. In other words, the color difference between the maximum lightness color and the maximum chroma color is converted into a lightness difference. The minimum lightness after correction is lightness L611 obtained by subtracting the color difference 609 as the correction amount Ml from the lightness L607. In other words, the color difference between the minimum lightness color and the maximum chroma color is converted into a lightness difference.

Figure 7:
FIG. 7 is a graph showing a lightness correction table.

FIG. 7 is a graph showing an example of the lightness correction table for expanding lightness in the lightness direction in FIG. 6. In this embodiment, color degeneration correction is performed by converting the color difference ΔE into the lightness difference. Sensitivity to the lightness difference is high because of the visual characteristic. Therefore, by converting the chroma difference into a lightness difference, it is possible to make the user feel the color difference ΔE despite a small lightness difference because of the visual characteristic. In addition, the lightness difference is smaller than the chroma difference because of the relationship between the sRGB color gamut and the color gamut of the printing apparatus 108. Therefore, it is possible to effectively use the narrow color gamut by conversion into a lightness difference. In this embodiment, the lightness of the maximum chroma color is not changed. In this embodiment, since the lightness of the color with the maximum chroma is not changed, it is possible to correct the color difference ΔE while maintaining the lightness of the maximum chroma color. Correction of a value greater than the maximum lightness and a value less than the minimum lightness may be undefined since these values are not included in the input image data. Furthermore, the lightness correction table may be complemented. In this case, as shown in FIG. 7, a value may be complemented to obtain a linear change. As described above, it is possible to decrease the number of grids of the lightness correction table to reduce the capacity, and to reduce the processing time taken to transfer the lightness correction table.

If the maximum lightness after correction exceeds the maximum lightness of the color gamut after gamut mapping, the CPU 102 performs maximum value clip processing. The maximum value clip processing is processing of subtracting the difference between the maximum lightness after correction and the maximum lightness of the color gamut after gamut mapping in the whole lightness correction table. In other words, the whole lightness correction table is shifted in the low lightness direction until the maximum lightness of the color gamut after gamut mapping becomes equal to the maximum lightness after correction. In this case, the lightness of the maximum chroma color after gamut mapping is also moved to the low lightness side. As described above, if the unique colors of the input image data are localized to the high lightness side, it is possible to improve the color difference ΔE and to reduce color degeneration by using the lightness tone range on the low lightness side. On the other hand, if the minimum lightness after correction is lower than the minimum lightness of the color gamut after gamut mapping, the CPU 102 performs minimum value clip processing. The minimum value clip processing adds the difference between the minimum lightness after correction and the minimum lightness of the color gamut after gamut mapping in the whole lightness correction table. In other words, the whole lightness correction table is shifted in the high lightness direction until the minimum lightness of the color gamut after gamut mapping becomes equal to the minimum lightness after correction. As described above, if the unique colors of the input image data are localized to the low lightness side, it is possible to improve the color difference ΔE and to reduce color degeneration by using the lightness tone range on the high lightness side.

Next, the CPU 102 applies, to the gamut mapping table, the lightness correction table created for each hue range. First, based on color information held by the output value of the gamut mapping, the CPU 102 decides the lightness correction table of a specific hue angle to be applied. For example, if the hue angle of the output value of the gamut mapping is 25°, the CPU 102 decides to apply the lightness correction table of the hue range 501 shown in FIG. 5. Then, the CPU 102 applies the decided lightness correction table to the output value of the gamut mapping table to perform correction. The CPU 102 sets the color information after correction as a new output value after the gamut mapping. For example, referring to FIG. 6, the CPU 102 applies the decided lightness correction table to the color 605 as the output value of the gamut mapping table, thereby correcting the lightness of the color 605. Then, the CPU 102 sets the lightness of a color 612 after correction as a new output value after the gamut mapping.

As described above, in this embodiment, the lightness correction table created based on the reference color is also applied to a color other than the reference color within the hue range 501. Then, with reference to the color after the lightness correction, for example, the color 612, mapping to a color gamut 616 is performed not to change the hue, as will be described later. That is, within the hue range 501, the color degeneration correction direction is limited to the lightness direction. With this arrangement, it is possible to suppress a change of a tint. Furthermore, it is unnecessary to perform color degeneration correction processing for all the combinations of the unique colors of the input image data, thereby making it possible to reduce the processing time.

In addition, in accordance with the hue angle of the output value of the gamut mapping, the lightness correction tables of adjacent hue ranges may be combined. For example, if the hue angle of the output value of the gamut mapping is Hn°, the lightness correction table of the hue range 501 and that of a hue range 502 are combined. More specifically, the lightness value of the output value after the gamut mapping is corrected by the lightness correction table of the hue range 501 to obtain a lightness value Lc501. Furthermore, the lightness value of the output value after the gamut mapping is corrected by the lightness correction table of the hue range 502 to obtain a lightness value Lc502. At this time, the intermediate hue angle of the hue range 501 is a hue angle H501, and the intermediate hue angle of the hue range 502 is a hue angle H502. In this case, the corrected lightness value Lc501 and the corrected lightness value Lc502 are complemented, thereby calculating a corrected lightness value Lc. The corrected lightness value Lc is calculated by:

$$Lc = \left|\frac{Hn - H_{501}}{H_{502} - H_{501}}\right| \times Lc_{501} + \left|\frac{Hn - H_{502}}{H_{502} - H_{501}}\right| \times Lc_{502} \tag{8}$$

As described above, by combining the lightness correction tables to be applied, in accordance with the hue angle, it is possible to suppress a sudden change of correction intensity caused by a change of the hue angle.

If the color space of the color information after correction is different from the color space of the output value after gamut mapping, the color space is converted and set as the output value after gamut mapping. For example, if the color space of the color information after correction is the CIE-L*a*b* color space, the following search is performed to obtain an output value after gamut mapping.

If the value after lightness correction exceeds the color gamut after gamut mapping, mapping to the color gamut after gamut mapping is performed. For example, the color 612 shown in FIG. 6 exceeds the color gamut 616 after gamut mapping. In this case, the color 612 is mapped to a color 614. A mapping method used here is color difference minimum mapping that focuses on lightness and hue. In color difference minimum mapping that focuses on lightness and hue, the color difference ΔE is calculated by the following equation. In the CIE-L*a*b* color space, color information of a color exceeding the color gamut after gamut mapping is represented by Ls, as, and bs. Color information of a color within the color gamut after gamut mapping is represented by Lt, at, and bt. ΔL represents a lightness difference, ΔC represents a chroma difference, and ΔH represents a hue difference. In addition, Wl represents a weight of lightness, Wc represents a weight of chroma, Wh represents a weight of a hue angle, and ΔEw represents a weighted color difference.

$$\Delta E = \sqrt{(L_s - L_t)^2 + (a_s - a_t)^2 + (b_s - b_t)^2} \tag{9}$$

$$\Delta L = \sqrt{(L_s - L_t)^2} \tag{10}$$

$$\Delta C = \sqrt{(a_s - a_t)^2 + (b_s - b_t)^2} \tag{11}$$

$$\Delta H = \Delta E - (\Delta L + \Delta C) \tag{12}$$

$$\Delta Ew = Wl \times \Delta L + Wc \times \Delta C + Wh \times \Delta H \tag{13}$$

Since the color difference ΔE is converted and expanded in the lightness direction, mapping is performed by focusing on lightness more than chroma. That is, the weight Wl of lightness is greater than the weight Wc of chroma. Furthermore, since hue largely influences a tint, it is possible to minimize a change of the tint before and after correction by performing mapping by focusing on hue more than lightness and chroma. That is, the weight Wh of hue is equal to or greater than the weight Wl of lightness, and is greater than the weight We of chroma. As described above, according to this embodiment, it is possible to correct the color difference ΔE while maintaining a tint.

Furthermore, the color space may be converted at the time of performing color difference minimum mapping. It is known that in the CIE-L*a*b* color space, a color change in the chroma direction does not obtain the same hue. Therefore, if a change of the hue angle is suppressed by increasing the weight of hue, mapping to a color of the same hue is not performed. Thus, the color space may be converted into a color space in which the hue angle is bent so that the color change in the chroma direction obtains the same hue. As described above, by performing color difference minimum mapping by weighting, it is possible to suppress a change of a tint.

Referring to FIG. 6, the color 605 obtained after performing gamut mapping for the color 601 is corrected to the color 612 by the lightness correction table. Since the color 612 exceeds the color gamut 616 after gamut mapping, the color 612 is mapped to the color gamut 616. That is, the color 612 is mapped to the color 614. As a result, in this embodiment, with respect to the gamut mapping table after correction, if the color 601 is input, the color 614 is output.

This embodiment has explained the example in which the lightness correction table is created for each hue range. However, the lightness correction table may be created by combining with the lightness correction table of the adjacent hue range. More specifically, within a hue range obtained by combining the hue ranges 501 and 502 in FIG. 5, the number of combinations of colors subjected to color degeneration is detected. Next, within a hue range obtained by combining the hue range 502 and a hue range 503, the number of combinations of colors subjected to color degeneration is detected. That is, by performing detection by overlapping each hue range, it is possible to suppress a sudden change of the number of combinations of colors subjected to color degeneration, at the time of crossing the hue ranges. In this case, a preferred hue range is a hue angle range obtained by combining two hue ranges, within which colors can be recognized as identical colors. For example, the hue angle in the CIE-L*a*b* color space is 30°. That is, one hue angle range is 15°. This can suppress a sudden change of correction intensity of color degeneration over hue ranges.

This embodiment has explained the example in which the color difference ΔE is corrected in the lightness direction by setting a plurality of unique colors as one group. As the visual characteristic, it is known that sensitivity to the lightness difference varies depending on chroma, and sensitivity to the lightness difference of low chroma is higher than sensitivity to the lightness difference of high chroma. Therefore, the correction amount in the lightness direction may be controlled by a chroma value. That is, the correction amount in the lightness direction is controlled to be small for low chroma, and correction is performed, for high chroma, by the above-described correction value in the lightness direction. More specifically, if correction of lightness is performed by the lightness correction table, the lightness value Ln before correction and the lightness value Lc after correction are divided by a chroma correction ratio S. Based on the chroma value Sn of the output value after gamut mapping and the maximum chroma value Sm of the color gamut after gamut mapping at the hue angle of the output value after gamut mapping, the chroma correction ratio S is calculated by:

$$S = Sn/Sm \tag{14}$$

$$Lc' = S \times Lc + (1 - S) \times Ln \tag{15}$$

That is, as the maximum chroma value Sm of the color gamut after gamut mapping is closer, the chroma correction ratio S is closer to 1, and Lc' is closer to the lightness value Lc after correction, which is obtained by the lightness correction table. On the other hand, as the chroma value Sn of the output value after gamut mapping is lower, the chroma correction ratio S is closer to 0, and Lc' is closer to the lightness value Ln before correction. In other words, as the chroma value Sn of the output value after gamut mapping is lower, the correction value of lightness is lower. Furthermore, the correction amount may be set to zero in a low-chroma color gamut. With this arrangement, it is possible to suppress a color change around a gray axis. Furthermore, since color degeneration correction can be performed in accordance with the visual sensitivity, it is possible to suppress excessive correction.

Third Embodiment

The third embodiment will be described below concerning points different from the first and second embodiments. If colors of input image data have different hue angles, identifiability may degrade after gamut mapping. For example, like high-chroma colors having a complementary color relationship, even if a sufficient distance between colors is kept by having sufficiently different hue angles, a lightness difference may decrease after gamut mapping. If mapping to the low chroma side is performed, it is assumed that degradation of identifiability caused by a decrease in lightness difference is conspicuous. In this embodiment, if the lightness difference after gamut mapping decreases to a predetermined color difference ΔE or less, correction is performed to increase the lightness difference. This arrangement can suppress degradation of identifiability.

Color degeneration determination processing in step S202 according to this embodiment will be described. In step S202, based on a unique color list detected in step S201, a CPU 102 detects the number of combinations of colors subjected to lightness degeneration from combinations of unique colors included in image data. A description will be provided with reference to a schematic view shown in FIG. 8.

Figure 8:
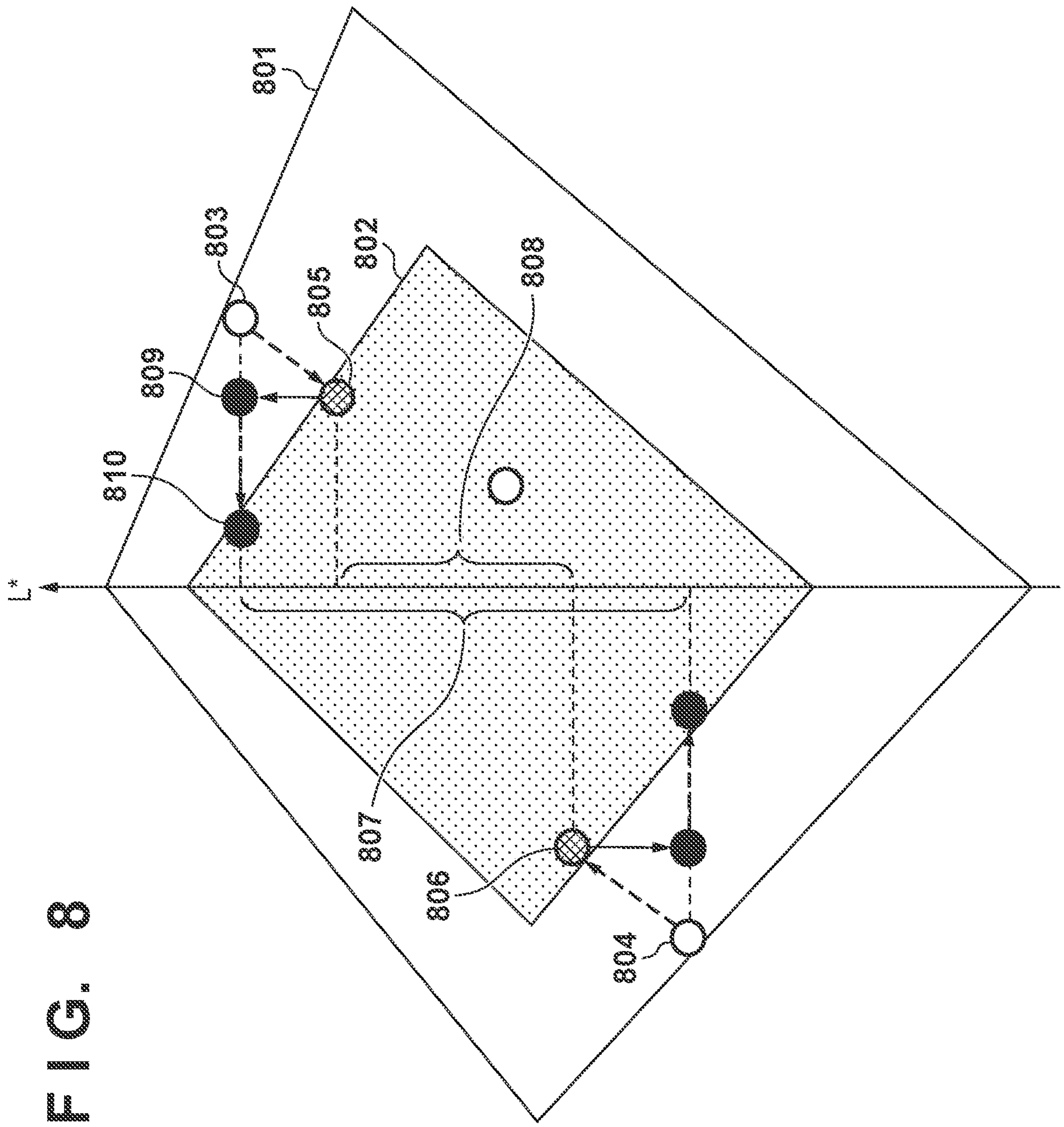
FIG. 8 is a view for explaining color degeneration correction processing in step S205.

The ordinate in FIG. 8 represents lightness L in the CIE-L*a*b* color space. The abscissa represents a projection on an arbitrary hue angle plane. A color gamut 801 is the color gamut of input image data. A color gamut 802 is a color gamut after gamut mapping in step S102. Colors 803 and 804 are colors included in the input image data. A color 805 is a color obtained by performing color conversion for the color 803 by gamut mapping. A color 806 is a color obtained by performing color conversion for the color 804 by gamut mapping. If a lightness difference 808 between the colors 805 and 806 is less than a lightness difference 807 between the colors 803 and 804, the CPU 102 determines that the lightness difference has decreased. The CPU 102 repeats the above detection processing the number of times that is equal to the number of combinations of unique colors included in the image data. Preferably, the number of combinations of colors with the decreased lightness difference in the CIE-L*a*b* color space is detected. Color information in the CIE-L*a*b* color space is represented in a color space with three axes of L*, a*, and b*. The color 803 is represented by L803, a803, and b803. The color 804 is represented by L804, a804, and b804. The color 805 is represented by L805, a805, and b805. The color 806 is represented by L806, a806, and b806. If the input image data is represented in another color space, it can be converted into the CIE-L*a*b* color space using a known technique. The lightness difference ΔL 807 and the lightness difference ΔL 808 are calculated by:

$$\Delta L_{801}=(L_{803}-L_{804})^2 \quad (16)$$

$$\Delta L_{808}=(L_{805}-L_{806})^2 \quad (17)$$

If the lightness difference ΔL 808 is less than the lightness difference ΔL 807, the CPU 102 determines that the lightness difference has decreased. Furthermore, in a case when the lightness difference ΔL 808 does not have such a magnitude that a color difference can be identified, the CPU 102 determines that color degeneration has occurred. If the lightness difference between the colors 805 and 806 is such a lightness difference that the colors can be identified as different colors based on the human visual characteristic, it is unnecessary to perform processing of correcting the lightness difference. In terms of the visual characteristic, 2.0 is set as the lightness difference ΔL with which the colors can be identified as different colors. That is, in a case when the lightness difference ΔL 808 is less than the lightness difference ΔL 807 and is less than 2.0, the CPU 102 may determine that lightness difference has decreased.

Next, color degeneration correction processing in step S205 according to this embodiment will be described with reference to FIG. 8. The CPU 102 calculates a correction ratio T based on the number of combinations of the unique colors of the input image data and the number of combinations of the colors with the decreased lightness difference. A preferred calculation formula is given by:

correction ratio $T$=number of combinations of colors with decreased lightness difference/number of combinations of unique colors The correction ratio T is lower as the number of combinations of the colors with the decreased lightness difference is fewer, and is higher as the number of combinations of the colors with the decreased lightness difference is greater. As described above, as the number of combinations of the colors with the decreased lightness difference is greater, color degeneration correction can be performed more strongly.

Next, lightness difference correction is performed based on the correction ratio T and lightness before gamut mapping. Lightness Lc after lightness difference correction is obtained by dividing lightness Lm before gamut mapping and lightness Ln after gamut mapping by the correction ratio T. That is, the lightness Lm is the lightness of the color 804, and the lightness Ln is the lightness of the color 806. A calculation formula is given by:

$$Lc=T\times Lm+(1-T)\times Ln$$

The CPU 102 repeats the above lightness difference correction processing the number of times that is equal to the number of combinations of the unique colors of the input image data. Referring to FIG. 8, lightness difference correction is performed so as to divide the lightness L803 of the color 803 and the lightness L805 of the color 805 by the correction ratio T. As a result of the lightness difference correction processing, a color 809 is obtained. If the color 809 falls outside the color gamut after gamut mapping, a search described in the second embodiment is performed, and mapping to a color 810 within the color gamut after gamut mapping is performed. The same processing as the above-described processing is performed for the color 804.

As described above, according to this embodiment, it is possible to perform, for a color included in the image data, gamut mapping that is corrected to increase the lightness difference, thereby reducing the degree of color degeneration caused by gamut mapping.

This embodiment has explained the colors 803 and 804. The lightness difference correction processing for the colors 803 and 804 may be applied to another color. For example, the lightness difference correction processing of this embodiment may be performed for a reference color of color degeneration correction processing, and may also be applied to another color. For example, the lightness difference correction processing for the colors 803 and 804 may be applied to a color within a predetermined hue range including the color 803 and a color within a predetermined hue range including the color 804. As described above, it is possible to reduce color degeneration and a decrease in the lightness difference caused by gamut mapping, and also to reduce a change of a tint.

Fourth Embodiment

The fourth embodiment will be described below concerning points different from the first to third embodiments. Among colors included in input image data, there are colors that are identical colors but have different meanings. For example, a color used in a graph and a color used as part of gradation have different meanings in identification. For a color used in a graph, it is important to distinguish the color from another color in the graph. Therefore, it is necessary to perform color degeneration correction strongly. On the other hand, for a color used as part of gradation, tonality with colors of surrounding pixels is important. It is thus necessary to perform color degeneration correction weakly. Assume that the two colors are identical colors and undergo color degeneration correction at the same time. In this case, if color degeneration correction is uniformly performed for the input image data by focusing on color degeneration correction of the color in the graph, color degeneration correction is performed strongly for gradation, and tonality in gradation degrades. On the other hand, if color degeneration correction for gradation is uniformly performed for the input image data by focusing on tonality in gradation, color degeneration correction is performed weakly for the graph, and identifiability of the color in the graph degrades. In addition, the number of combinations of unique colors becomes great, and the effect of reducing color degeneration lowers. The same applies to a case when the input image data includes a plurality of pages and color degeneration correction processing is uniformly performed for the plurality of pages and a case when the input image data includes one page and color degeneration correction processing is uniformly performed for the entire page.

In this embodiment, in either of the case when the input image data includes a plurality of pages and the case when the input image data includes one page, a plurality of areas are set and color degeneration correction processing is performed individually for each area. As a result, the color degeneration correction processing can be performed for each area with appropriate correction intensity in accordance with colors on the periphery. For example, a color in a graph can be corrected by focusing on identifiability, and a color in gradation can be corrected by focusing on tonality.

Figure 9:
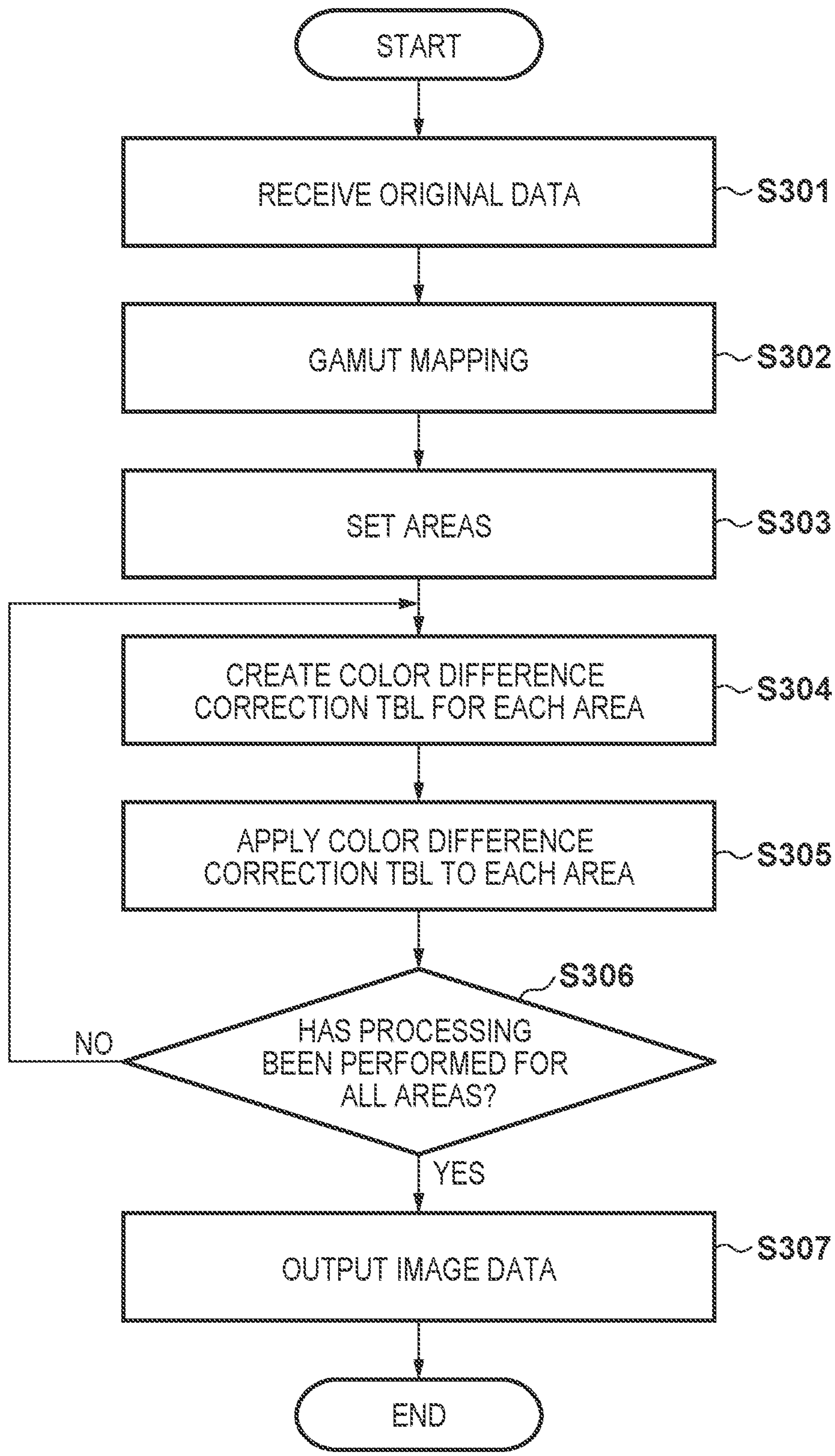
FIG. 9 is a flowchart illustrating processing of performing color degeneration correction processing for each area.

FIG. 9 is a flowchart illustrating processing of setting areas in a single page and then performing color degeneration correction processing for each area.

Steps S301, S302, and S307 are the same as steps S101, S102, and S105 of FIG. 2 and a description thereof will be omitted. That is, even if the input image data includes a plurality of areas, gamut mapping is performed for the whole input image data once.

In step S303, a CPU 102 sets areas in the input image data. In step S304, the CPU 102 performs processing of creating the above-described color degeneration-corrected gamut mapping table for each area set in step S303. That is, since the number of use unique colors is different for each area, the color degeneration-corrected gamut mapping table which is created by the processing of FIG. 3 is different for each area. The color degeneration-corrected gamut mapping table is created for each area, as described in each of the first to third embodiments.

In step S305, the CPU 102 applies, to each area, the color degeneration-corrected gamut mapping table that has been created in step S304. In step S306, the CPU 102 determines whether the processes in steps S304 and S305 have been performed for the areas set in step S303. If it is not determined that the processes have been performed for all the areas, the processes from step S304 are performed by focusing on an area for which the processes in steps S304 and S305 have not been performed. If it is determined that the processes have been performed for all the areas, the process advances to step S307.

Figure 10:
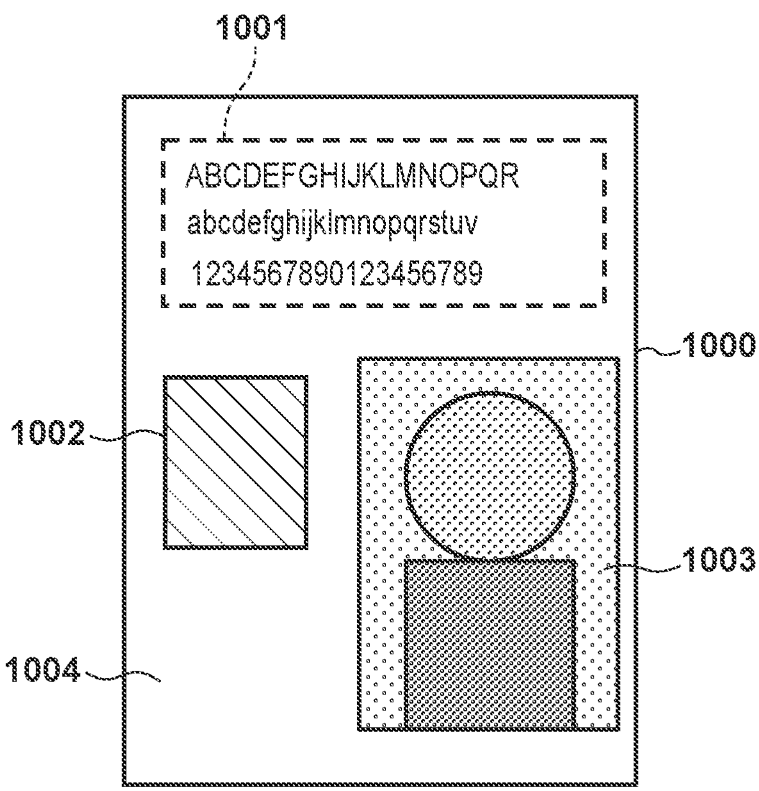
FIG. 10 is a view for explaining an original page.

The area setting processing in step S303 will be described in detail. FIG. 10 is a view for explaining an example of a page of the image data (to be referred to as original data hereafter) input in step S301 of FIG. 9. Assume that the document data is described in PDL. PDL is an abbreviation for Page Description Language, and is formed by a set of drawing instructions on a page basis. The types of drawing instructions are defined for each PDL specification. In this embodiment, the following three types are used as an example.

Instruction (1) TEXT drawing instruction (X1, Y1, color, font information, character string information)

Instruction (2) BOX drawing instruction (X1, Y1, X2, Y2, color, paint shape)

Instruction (3) IMAGE drawing instruction (X1, Y1, X2, Y2, image file information)

In some cases, drawing instructions such as a DOT drawing instruction for drawing a dot, a LINE drawing instruction for drawing a line, and a CIRCLE drawing instruction for drawing a circle are used as needed in accordance with the application purpose. For example, a general PDL such as Portable Document Format (PDF) proposed by Adobe, XPS proposed by Microsoft, or HP-GL/2 proposed by HP may be used.

An original page 1000 in FIG. 10 represents one page of original data, and, as an example, the number of pixels is 600 horizontal pixels×800 vertical pixels. An example of PDL corresponding to the document data of the original page 1000 in FIG. 10 is shown below.

<PAGE=001>
<TEXT>50,50,550,100,BLACK,STD-18, “ABCDEFGHIJKLMNOPQR”</TEXT>
<TEXT>50,100,550,150,BLACK,STD-18, “abcdefghijklmnopqrstuv”</TEXT>
<TEXT>50,150,550,200,BLACK,STD-18, “1234567890123456789”</TEXT>
<BOX>50,350,200,550,GRAY,STRIPE</BOX>
<IMAGE>250,300,580,700,“PORTRAIT.jpg”</IMAGE>
</PAGE>

<PAGE=001> of the first row is a tag representing the number of pages in this embodiment. Normally, since the PDL is designed to be able to describe a plurality of pages, a tag representing a page break is described in the PDL. In this example, the section up to </PAGE> represents the first page. In this embodiment, this corresponds to the original page 1000 in FIG. 10. If the second page exists, <PAGE=002> is described next to the above PDL.

The section from <TEXT> of the second row to </TEXT> of the third row is drawing instruction 1, and this corresponds to the first row of an area 1001 in FIG. 10. The first two coordinates represent the coordinates (X1, Y1) at the upper left corner of the drawing area, and the following two coordinates represent the coordinates (X2, Y2) at the lower right corner of the drawing area. The subsequent description shows that the color is BLACK (black: R=0, G=0, B=0), the character font is "STD" (standard), the character size is 18 points, and the character string to be described is "ABCDEFGHIJKLMNOPQR".

The section from <TEXT> of the fourth row to </TEXT> of the fifth row is drawing instruction 2, and this corresponds to the second row of the area 1001 in FIG. 10. The first four coordinates and two character strings represent the drawing area, the character color, and the character font, like drawing instruction 1, and it is described that the character string to be described is "abcdefghijklmnopqrstuv".

The section from <TEXT> of the sixth row to </TEXT> of the seventh row is drawing instruction 3, and this corresponds to the third row of the area 1001 in FIG. 10. The first four coordinates and two character strings represent the drawing area, the character color, and the character font, like drawing instruction 1 and drawing instruction 2, and it is described that the character string to be described is "1234567890123456789".

The section from <BOX> to </BOX> of the eighth row is drawing instruction 4, and this corresponds to an area 1002 in FIG. 10. The first two coordinates represent the upper left coordinates (X1, Y1) at the drawing start point, and the following two coordinates represent the lower right coordinates (X2, Y2) at the drawing end point. Next, the color is GRAY (gray: R=128, G=128, B=128), and STRIPE (stripe pattern) is designated as the paint shape. In this embodiment, as for the direction of the stripe pattern, lines in the forward diagonal direction are used. The angle or period of lines may be designated in the BOX instruction.

Next, the IMAGE instruction of the ninth and 10th rows corresponds to an area 1003 in FIG. 10. Here, it is described that the file name of the image existing in the area is "PORTRAIT.jpg". This indicates that the file is a JPEG file that is a popular image compression format. Then, </PAGE> described in the 11th row indicates that the drawing of the page ends.

There is a case when an actual PDL file integrates "STD" font data and a "PORTRAIT.jpg" image file in addition to the above-described drawing instruction group. This is because, if the font data and the image file are separately managed, the character portion and the image portion cannot be formed only by the drawing instructions, and information needed to form the image shown in FIG. 10 is insufficient. In addition, an area 1004 in FIG. 10 is an area where no drawing instruction exists, and is blank.

In an original page described in PDL, like the original page 1000 shown in FIG. 10, the area setting processing in step S303 of FIG. 9 can be implemented by analyzing the above PDL. More specifically, in the drawing instructions, the start points and the end points of the drawing y-coordinates are as follows, and these continue from the viewpoint of areas.

| Drawing instruction | Y start point | Y end point |
|---|---|---|
| First TEXT instruction | 50 | 100 |
| Second TEXT instruction | 100 | 150 |
| Third TEXT instruction | 150 | 200 |
| BOX instruction | 350 | 550 |
| IMAGE instruction | 300 | 700 |

In addition, it is found that both the BOX instruction and the IMAGE instruction are apart from the TEXT instructions by one hundred pixels in the Y direction.

Next, in the BOX instruction and the IMAGE instruction, the start points and the end points of the drawing x-coordinates are as follows, and it is found that these are apart by fifty pixels in the X direction.

| Drawing instruction | X start point | X end point |
|---|---|---|
| BOX instruction | 50 | 200 |
| IMAGE instruction | 250 | 580 |

Thus, three areas can be set as follows.

| Areas | X start point | Y start point | X end point | Y end point |
|---|---|---|---|---|
| First area | 50 | 50 | 550 | 200 |
| Second area | 50 | 350 | 200 | 550 |
| Third area | 250 | 300 | 580 | 700 |

Not only the configuration for thus analyzing PDL and performing area setting but also a configuration for performing area setting using a drawing result may be employed. The configuration will be described below.

Figure 11:
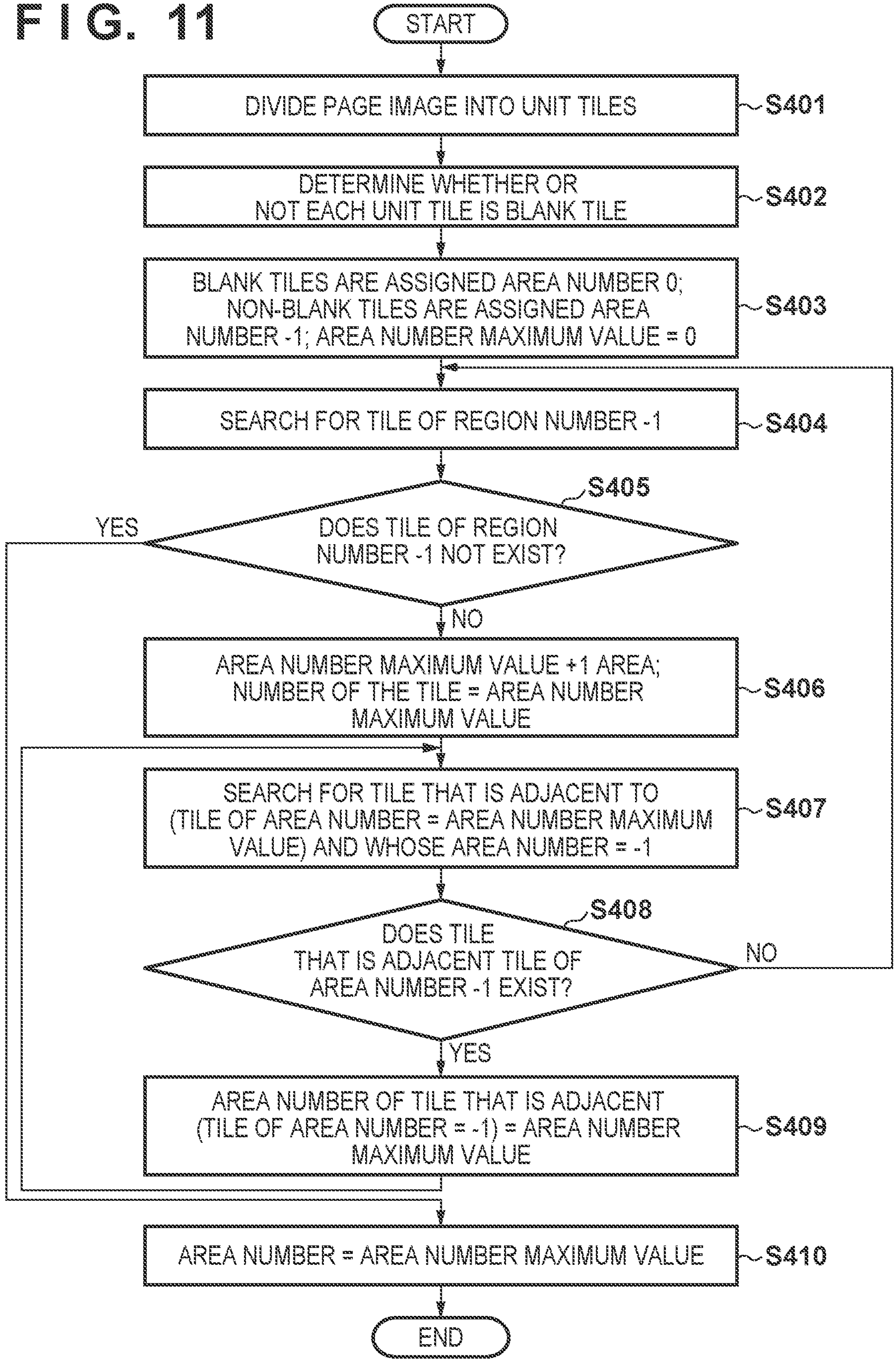
FIG. 11 is a flowchart illustrating processing of performing area setting for each tile.

FIG. 11 is a flowchart illustrating processing of performing the area setting, processing in step S303 on a tile basis. In step S401, the CPU 102 divides an original page into unit tiles and sets them. In this embodiment, the original page is divided into tiles each having thirty pixels in each of the vertical and horizontal directions and set. Here, first, a variable for setting an area number for each tile is set as Area_number[20][27]. The original page includes 600 pixels×800 pixels, as described above. Hence, the tiles each formed by thirty pixels in each of the vertical and horizontal directions include twenty tiles in the X direction×27 tiles in the Y direction.

Figure 12:
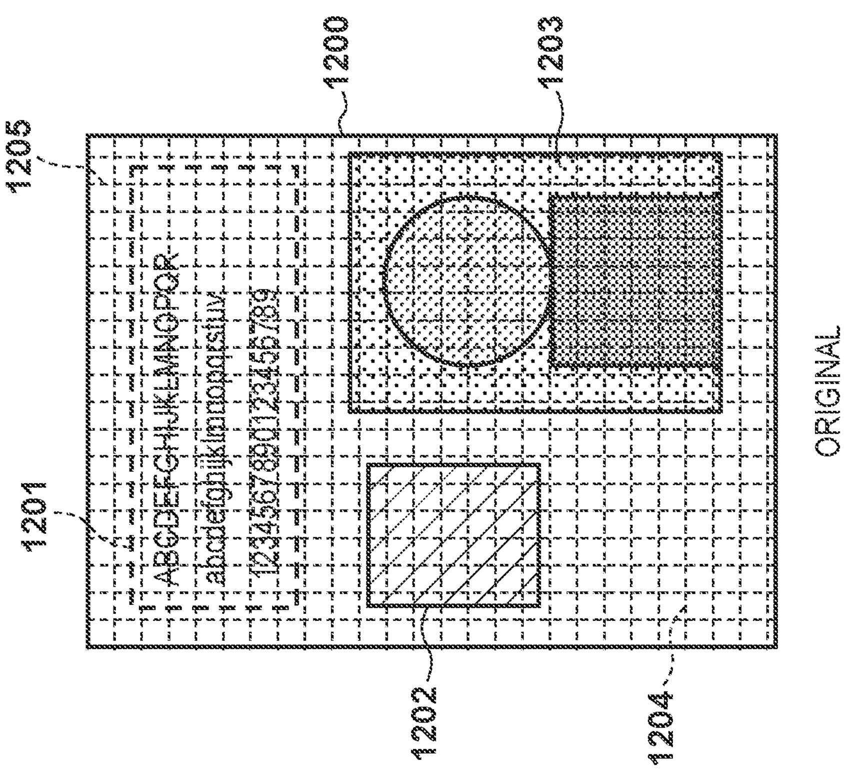
FIG. 12 is a view showing an image of tile setting of the original page.

FIG. 12 is a view showing an image of tile division of the original page according to this embodiment. An original page 1200 in FIG. 12 represents the whole original page. An area 1201 in FIG. 12 is an area in which TEXT is drawn, an area 1202 is an area in which BOX is drawn, an area 1203 is an area in which IMAGE is drawn, and an area 1204 is an area in which none are drawn.

In step S402, the CPU 102 determines, for each tile, whether it is a blank tile. This determination may be done based on the start point and the end point of the x- and y-coordinates in a drawing instruction, as described above, or may be done by detecting tiles in which all pixel values in the actual unit tiles are R=G=B=255. Whether to determine based on the drawing instructions or determine based on the pixel values may be decided based on the processing speed and the detection accuracy.

In step S403, the CPU 102 sets the initial values of the values as follows.

Area number "0" is set for a tile determined to be a blank tile in step S402.

Area number "−1" is set for a tile (non-blank) other than above.

"0" is set to the area number maximum value.

More specifically, the setting is done in the following way.

Blank tile (x1, y1) area_number[x1][y1]=0

Non-blank tile (x2, y2) area_number[x1][y1]=−1

Area number maximum value max_area_number=0

That is, at the time of completion of the processing of step S403, all tiles are set with "0" or "−1".

In step S404, the CPU 102 searches for a tile whose area number is "−1". More specifically, determination is performed for the ranges of x=0 to 19 and y=0 to 26 in the following way.

if (area_number[x][y]=−1)→detected else→not detected

If an area with the area number "−1" is detected for the first time, the process advances to step S405. At this time, in step S405, the CPU 102 determines that a tile with the area number "−1" exists, and advances to step S406. If the area numbers of all areas are not "−1", the CPU 102 determines, in step S405, that there exists no tile with the area number "−1". In this case, the process advances to step S410.

In step S406, the CPU 102 increments the area number maximum value by +1, and sets the area number of the tile to the updated area number maximum value. More specifically, the detected area (x3, y3) is processed in the following way.

max_area_number=max_area_number+1 area_number[x3][y3]=max_area_number

For example, here, since the area is an area detected for the first time after the processing of step S406 is executed for the first time, the area number maximum value is "1", and the area number of the tile is set to "1". From then on, every time the processing of step S406 is executed, the number of areas increases by one. After this, in steps S407 to S409, processing of expanding continuous non-blank areas as the same area is performed.

In step S407, the CPU 102 searches for a tile that is a tile adjacent to the tile whose area number is the area number maximum value and has the area number "−1". More specifically, the following determination is performed for the ranges of x=0 to 19 and y=0 to 26.

if (area_number[x][y]=max_area_number)
if ((area_number[x−1][y]=−1) or
(area_number[x+1][y]=−1) or
(area_number[x][y−1]=−1) or
(area_number[x][y+1]=−1))→detected
else→not detected If an adjacent area with the area number "−1" is detected for the first time, the CPU 102 determines, in step S408, that an adjacent area with the area number "−1" is detected, and advances to step S409. On the other hand, if the area numbers of all areas are not "−1", the CPU 102 determines, in step S408, that an adjacent area with the area number "−1" is not detected, and advances to step S405.

In step S409, the CPU 102 sets the area number of the tile that is the adjacent tile and has the area number "−1" to the area number maximum value. More specifically, this is implemented by setting, for the detected adjacent tile, the tile position of interest to (x4, y4) and performing processing in the following way.

if ((area_number[x4−1][y4]=−1)
area_number[x4−1][y4]=max_area_number
if ((area_number[x4+1][y4]=−1)
area_number[x4+1][y4]=max_area_number
if ((area_number[x4][y4−1]=−1)
area_number[x4][y4−1]=max_area_number
if ((area_number[x4][y4+1]=−1)
area_number[x4][y4+1]=max_area_number If the area number of the adjacent tile is updated in step S409, the process returns to step S407 to continue the search to check whether another adjacent non-blank tile exists. In a situation in which no adjacent non-blank tile exists, that is, if a tile to which the area number maximum value should be added does not exist, the process returns to step S404.

In a state in which the area numbers of all areas are not "−1", that is, if all areas are blank areas, or any area number is set, it is determined that there exists no tile with the area number "−1". If the CPU 102 determines, in step S405, that there exists no tile with the area number "−1", the process advances to step S410.

In step S410, the CPU 102 sets the area number maximum value as the number of areas. That is, the area number maximum value set so far is the number of areas existing in the original page. The area setting processing in the original page is thus ended.

Figure 13:
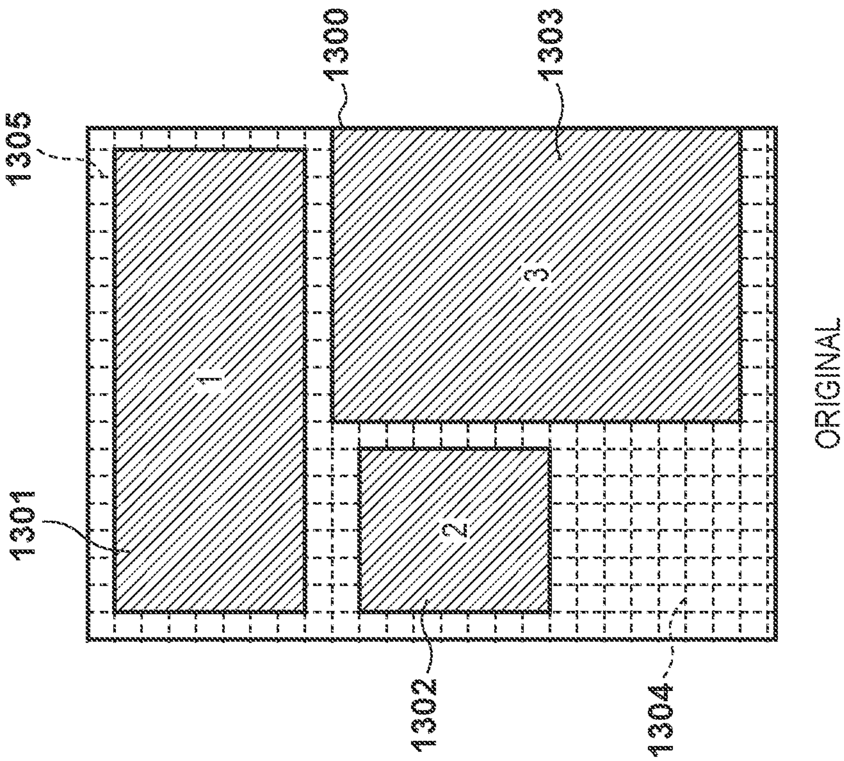
FIG. 13 is a view showing each tile area after the end of the area setting.

FIG. 13 is a view showing tile areas after the end of the area setting. An original page 1300 in FIG. 13 represents the whole original page. An area 1301 in FIG. 13 is an area in which TEXT is drawn, an area 1302 is an area in which BOX is drawn, an area 1303 is an area in which IMAGE is drawn, and an area 1304 is an area in which none are drawn. Hence, the result of the area setting is as follows.

| Number of areas = 3 | |
|---|---|
| Area number = 0 | blank area 1304 |
| Area number = 1 | text area 1301 |
| Area number = 2 | box area 1302 |
| Area number = 3 | image area 1303 |

As shown in FIG. 13, the areas are spatially far apart via at least one blank tile. In other words, a plurality of tiles between which no blank tile intervenes are considered to be adjacent and processed as the same area.

A human visual sense has a characteristic that the difference between two colors that are spatially adjacent or exist in very close places can easily be relatively perceived, but the difference between two colors that exist in places spatially far apart can hardly be relatively perceived. That is, the result of "output as different colors" can readily be perceived if the processing is performed for identical colors that are spatially adjacent or exist in very close places, but can hardly be perceived if the processing is performed for identical colors that exist in places spatially far apart.

In this embodiment, areas considered as different areas are separated by a predetermined distance or more on a paper surface. In other words, pixels separated via a background color by a distance less than a predetermined distance on a paper surface are considered to be in the same area. Examples of the background color are white, black, and gray. The background color may be a background color defined in the original data. If printing is executed on an A4 paper, a preferred distance is, for example, 0.7 mm or more. The preferred distance may be changed in accordance with a printed paper size. Alternatively, the preferred distance may be changed in accordance with an assumed observation distance. Furthermore, even if the areas are not separated by the predetermined distance on the paper surface, different objects may be considered as different areas. For example, even if an image area and a box area are not separated by the predetermined distance, the objects types are different, and thus these areas may be set as different areas.

In this embodiment, by performing area division as described above, it is possible to detect, for each area, the number of combinations of colors to undergo color degeneration correction processing. By detecting the number of combinations of colors for each area, color degeneration correction corresponding to each color distribution is performed for each of the different areas. On the other hand, by detecting the number of combinations of colors for each area, the same color degeneration correction is performed even for different areas that have identical color distributions. As a result, for example, the results of color degeneration correction processes for graphs that are separated as areas but have identical color distributions can be identical correction results.

Furthermore, by detecting, for each area, the number of combinations of colors to undergo color degeneration correction processing, it is possible to prevent the effect of reducing color degeneration from lowering due to an increase in number of combinations of unique colors.

As described above, in this embodiment, even in the same original page, portions that are spatially far apart are set as different areas and gamut mapping suitable for each area is performed, thereby making it possible to prevent both degradation of tonality and degradation of color degeneration correction.

This embodiment has explained an example of setting a plurality of areas in one page of original data but the operation of this embodiment may be applied by setting a page group included in a plurality of pages of original data as "areas" described in this embodiment. That is, the "areas" in step S303 may be set as a page group among the plurality of pages. Note that the page group includes not only a plurality of pages but also a single page.

Assume that original data to be printed is document data formed from a plurality of pages. Consider a specific page group, among the plurality of pages, to be set as a creation target of the above-described color degeneration-corrected gamut mapping table. For example, the document data is formed from the first to third pages. If each page is set as a creation target of the color degeneration-corrected gamut mapping table, each of the first, second, and third pages is set as a creation target. A group of the first and second pages may be set as a creation target, and the third page may be set as another creation target. The creation target is not limited to a group of pages included in the document data. For example, an area of a portion of the first page may be set as a creation target. In step S303, in accordance with a predetermined group, a plurality of creation targets may be set for the original data. Note that the user may be able to designate a group to be set as a creation target.

As described above, in this embodiment, even in a plurality of pages, a page group is set as a creation target, and a color degeneration-corrected gamut mapping table is applied to each creation target, thereby making it possible to prevent both degradation of tonality and degradation of color degeneration correction.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

In summary, the disclosure of the above embodiments include the following image processing apparatus, the image processing method, and the non-transitory computer-readable storage medium.

(Item 1). An image processing apparatus including an input unit configured to input first image data including a plurality of objects of different types, a generation unit configured to generate second image data from the first image data using a conversion unit configured to convert a first color gamut of the first image data into a second color gamut of a device configured to output the first image data, a setting unit configured to set a region of each of the plurality of objects from the first image data, an acquisition unit configured to acquire color information used for the region of each of the plurality of objects, and a correction unit configured to correct the conversion unit used for the region of each of the plurality of objects based on a conversion result from the first color gamut into the second color gamut and the color information used for the region of each of the plurality of objects, wherein, in a case when the correction unit corrects the conversion unit used for the region of each of the plurality of objects, the generation unit generates third image data from the first image data using the corrected conversion unit used for the region of each of the plurality of objects, and, in the third image data, correction is performed so that a color difference on the second image data is expanded by conversion by the corrected conversion unit used for the region of each of the plurality of objects.

(Item 2). The apparatus according to item 1, wherein a direction of the expansion of the color difference on the second image data is at least one of a lightness direction, a chroma direction, and a hue direction.

(Item 3). The apparatus according to item 1, wherein, in a case when the conversion result satisfies a condition, the correction unit corrects the conversion unit.

(Item 4). The apparatus according to item 3, wherein the condition includes a condition that a color difference between third color information and fourth color information on the second image data having undergone color gamut conversion using the conversion unit with respect to first color information and second color information used for the region of each of the plurality of objects set in the first image data by the setting unit is smaller than a predetermined color difference.

(Item 5). The apparatus according to item 4, wherein, in the correction of the conversion unit, the correction unit specifies fifth color information obtained by converting lightness of the third color information, specifies sixth color information obtained by moving the fifth color information to the second color gamut, and corrects the conversion unit so as to associate the first color information with the sixth color information.

(Item 6). The apparatus according to item 5, further including a creation unit configured to create conversion information between input lightness and output lightness, wherein the fifth color information is specified by converting the lightness of the third color information by the conversion information.

(Item 7). The apparatus according to item 6, wherein the creation unit creates the conversion information based on pieces of color information of maximum lightness, minimum lightness, and maximum chroma of the region of each of the plurality of objects set in the first image data by the setting unit.

(Item 8). The apparatus according to item 7, wherein a range of output lightness of the conversion information is defined by associating a color difference between the color information of the maximum lightness and the color information of the maximum chroma and a color difference between the color information of the minimum lightness and the color information of the maximum chroma with each other in a lightness direction.

(Item 9). The apparatus according to item 8, wherein the range of the output lightness of the conversion information is smaller as the number of combinations of colors satisfying the condition is smaller.

(Item 10). The apparatus according to item 8, wherein the range of the output lightness of the conversion information is smaller as the maximum chroma is lower.

(Item 11). The apparatus according to item 5, wherein movement of the fifth color information to the second color gamut is performed based on color difference minimum mapping that minimizes a color difference with respect to the second color gamut, and, in the color difference minimum mapping, a weight is set for each of lightness, chroma, and hue, and the weights of the lightness and the hue are set larger than the weight of the chroma.

(Item 12). The apparatus according to item 1, wherein the color difference is a lightness difference between seventh color information and eighth color information on the second image data, and, in a case when the lightness difference on the second image data is smaller than a predetermined lightness difference as the conversion result, the correction unit corrects the conversion unit so that the lightness difference on the second image data is large.

(Item 13). The apparatus according to item 12, wherein the correction unit specifies 11th color information obtained by moving, in a lightness direction, 10th color information of the second color gamut obtained as a result of performing conversion of ninth color information of the first color gamut by the conversion unit, and specifies 12th color information from the 11th color information based on color difference minimum mapping from the first color gamut to the second color gamut, the conversion unit is corrected so as to convert the ninth color information into the 12th color information, and, in the color difference minimum mapping, a weight is set for each of lightness, chroma, and hue, and the weights of the lightness and the hue are set larger than the weight of the chroma.

(Item 14). The apparatus according to item 12, wherein the correction unit corrects the conversion unit so that the lightness difference on the second image data is larger as the number of combinations of colors for which the lightness difference on the second image data is smaller than the predetermined lightness difference is larger.

(Item 15). The apparatus according to item 1, wherein the first image data is image data formed from a plurality of pages, the setting unit sets the region of each of the plurality of objects included in at least one of the plurality of pages, and the acquisition unit acquires color information used for the region of each of the plurality of objects set by the setting unit.

(Item 16). The apparatus according to item 1, wherein the region of each of the plurality of objects is at least one of a text region, a box region, and an image region.

(Item 17). The apparatus according to item 1, further including an output unit configured to output the third image data to the device, wherein the device is a printing apparatus configured to print an image on a print medium based on the third image data output from the output unit.

(Item 18). An image processing method including inputting first image data including a plurality of objects of different types, generating second image data from the first image data using a conversion unit configured to convert a first color gamut of the first image data into a second color gamut of a device configured to output the first image data, setting a region of each of the plurality of objects from the first image data, acquiring color information used for the region of each of the plurality of objects, and correcting the conversion unit used for the region of each of the plurality of objects based on a conversion result from the first color gamut into the second color gamut and the color information used for the region of each of the plurality of objects, wherein, in a case when the conversion unit used for the region of each of the plurality of objects is corrected, third image data is generated from the first image data using the corrected conversion unit used for the region of each of the plurality of objects, and, in the third image data, correction is performed so that a color difference on the second image data is expanded by conversion by the corrected conversion unit used for the region of each of the plurality of objects.

(Item 19). A non-transitory computer-readable storage medium storing a program configured to cause a computer to function to input first image data including a plurality of objects of different types, to generate second image data from the first image data using a conversion unit configured to convert a first color gamut of the first image data into a second color gamut of a device configured to output the first image data, to set a region of each of the plurality of objects from the first image data, to acquire color information used for the region of each of the plurality of objects, and to correct the conversion unit used for the region of each of the plurality of objects based on a conversion result from the first color gamut into the second color gamut and the color information used for the region of each of the plurality of objects, wherein, in a case when the conversion unit used for the region of each of the plurality of objects is corrected, third image data is generated from the first image data using the corrected conversion unit used for the region of each of the plurality of objects, and, in the third image data, correction is performed so that a color difference on the second image data is expanded by conversion by the corrected conversion unit used for the region of each of the plurality of objects.

The disclosure of the above embodiments further include the following image processing apparatus, the image processing method, and the non-transitory computer-readable storage medium.

(Item 1). An image processing apparatus including an input unit configured to input first image data, a generation unit configured to generate second image data from the first image data using a conversion unit configured to convert a first color gamut of the first image data into a second color gamut of a device configured to output the first image data, and a correction unit configured to correct the conversion unit based on a conversion result from the first color gamut into the second color gamut, wherein, in a case when the correction unit corrects the conversion unit, the generation unit generates third image data from the first image data using the corrected conversion unit, in the third image data, correction is performed so that a lightness difference on the second image data becomes large by conversion by the corrected conversion unit, and the lightness difference is a lightness difference between first color information and second color information on the second image data.

(Item 2). The apparatus according to item 1, wherein, in a case when the lightness difference on the second image data is smaller than a predetermined lightness difference as the conversion result, the correction unit corrects the conversion unit so that the lightness difference on the second image data is large.

(Item 3). The apparatus according to item 2, wherein the predetermined lightness difference is a lightness difference with which the first color information and the second color information can be identified based on a visual characteristic of a user.

(Item 4). The apparatus according to item 1, wherein the correction unit specifies fifth color information obtained by moving, in a lightness direction, fourth color information of the second color gamut obtained as a result of performing conversion of third color information of the first color gamut by the conversion unit, and specifies sixth color information from the fifth color information based on color difference minimum mapping from the first color gamut to the second color gamut, and the conversion unit is corrected so as to convert the third color information into the sixth color information.

(Item 5). The apparatus according to item 4, wherein, in the color difference minimum mapping, a weight is set for each of lightness, chroma, and hue, and the weights of the lightness and the hue are set larger than the weight of the chroma.

(Item 6). The apparatus according to item 1, wherein the second color gamut is a color reproduction gamut of the device.

(Item 7). The apparatus according to item 2, wherein the correction unit corrects the conversion unit so that the lightness difference on the second image data is larger as the number of combinations of colors for which the lightness difference on the second image data is smaller than the predetermined lightness difference is larger.

(Item 8). The apparatus according to item 1, further including an output unit configured to output the third image data to the device, wherein the device is a printing apparatus configured to print an image on a print medium based on the third image data output from the output unit.

(Item 9). The apparatus according to item 1, wherein a first hue range including the first color information is sufficiently apart from a second hue range including the second color information.

(Item 10). An image processing method including inputting first image data, generating second image data from the first image data using a conversion unit configured to convert a first color gamut of the first image data into a second color gamut of a device configured to output the first image data, and correcting the conversion unit based on a conversion result from the first color gamut into the second color gamut, wherein, in a case when the conversion unit is corrected, third image data is generated from the first image data using the corrected conversion unit, in the third image data, correction is performed so that a lightness difference on the second image data becomes large by conversion by the corrected conversion unit, and the lightness difference is a lightness difference between first color information and second color information on the second image data.

(Item 11). A non-transitory computer-readable storage medium storing a program configured to cause a computer to function to input first image data, to generate second image data from the first image data using a conversion unit configured to convert a first color gamut of the first image data into a second color gamut of a device configured to output the first image data, and to correct the conversion unit based on a conversion result from the first color gamut into the second color gamut, wherein, in a case when the conversion unit is corrected, third image data is generated from the first image data using the corrected conversion unit, in the third image data, correction is performed so that a lightness difference on the second image data becomes large by conversion by the corrected conversion unit, and the lightness difference is a lightness difference between first color information and second color information on the second image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:

one or more circuits; or one or more processors and at least one memory, the at least one memory being coupled to the one or more processors and having stored thereon instructions executable by the one or more processors, wherein at least one of the one or more circuits or the execution of the instructions cause the image processing apparatus to function as:

a generation unit configured to generate image data having undergone color gamut conversion from input image data using conversion data for converting from a color gamut of the input image data into a color gamut of an output device; and a correction unit configured to correct first conversion data to second conversion data based on a result of the color gamut conversion of using the first conversion data by the generation unit, wherein the generation unit further generates the image data having undergone the color gamut conversion using the second conversion data, first output data generated as a result of the color gamut conversion using the first conversion data from first image data including a first color and a second color includes a third color corresponding to the first color and a fourth color corresponding to the second color, second output data generated as a result of the color gamut conversion using the second conversion data from the first image data includes a fifth color corresponding to the first color and a sixth color corresponding to the second color, and a second color difference corresponding to a distance between the fifth color and the sixth color is greater than a first color difference corresponding to a distance between the third color and the fourth color.

2. The apparatus according to claim 1, wherein, in a predetermined color space, a distance in a lightness direction between the fifth color and the sixth color is greater than a distance in the lightness direction between the third color and the fourth color.

3. The apparatus according to claim 1, wherein, in a predetermined color space, a distance in a chroma direction between the fifth color and the sixth color is greater than a distance in the chroma direction between the third color and the fourth color.

4. The apparatus according to claim 1, wherein, in a predetermined color space, a distance in a hue angle direction between the fifth color and the sixth color is greater than a distance in the hue angle direction between the third color and the fourth color.

5. The apparatus according to claim 1, wherein, in a case when a result of the color gamut conversion satisfies a predetermined condition, the correction unit corrects the first conversion data to the second conversion data.

6. The apparatus according to claim 5, wherein the condition includes a predetermined condition that the first color difference is less than a predetermined value.

7. The apparatus according to claim 6, wherein the predetermined value is "2.0" as ΔE.

8. The apparatus according to claim 1, further comprising an acquisition unit configured to acquire information included in the input image data, wherein the first color and the second color are colors whose information is acquired based on the first image data.

9. The apparatus according to claim 1, wherein, in a case when the color gamut conversion does not satisfy the predetermined condition, it is determined that the correction unit does not correct the first conversion data.

10. The apparatus according to claim 1, wherein the correction unit specifies a seventh color obtained by correcting lightness of the third color, specifies the fifth color obtained by mapping the seventh color to the color gamut of the output device, and corresponds the first color and the fifth color to each other.

11. The apparatus according to claim 10, further comprising a lightness correction unit configured to correct lightness, wherein the seventh color is specified by correcting the lightness of the third color by the lightness correction unit.

12. The apparatus according to claim 11, wherein the lightness correction unit is a lookup table, and the lookup table is created based on colors of maximum lightness, minimum lightness, and maximum chroma of the image data.

13. The apparatus according to claim 12, wherein a range of output lightness of the lookup table is defined by a color difference between color of the maximum lightness and color of the maximum chroma and a color difference between color of the minimum lightness and color of the maximum chroma.

14. The apparatus according to claim 11, wherein a degree of the correction of the lightness by the lightness correction unit is less as the number of combinations of colors satisfying condition is less.

15. The apparatus according to claim 11, wherein a degree of the correction of the lightness by the lightness correction unit is less as chroma is lower.

16. The apparatus according to claim 10, wherein mapping of the seventh color to the color gamut of the output device is performed based on color difference minimum mapping that minimizes a color difference with respect to the color gamut of the output device.

17. The apparatus according to claim 16, wherein, in the color difference minimum mapping, a weight is set for each of lightness, chroma, and hue, and the weights of the lightness and the hue are set greater than the weight of the chroma.

18. The apparatus according to claim 1, wherein the first color and the second color are colors included in a hue angle with a predetermined range.

19. The apparatus according to claim 1, wherein the correction unit corrects the first conversion data to the second conversion data by corresponding the first color and the fifth color to each other and corresponding the second color and the sixth color to each other.

20. The apparatus according to claim 1, wherein the predetermined color space is CIE-L*a*b* color space.

21. The apparatus according to claim 1, wherein the correction unit corrects the first conversion data to the second conversion data by:

first specifying processing of specifying, among a plurality of color combinations included in the first output data, a combination whose distance in the predetermined color space is smaller than a predetermined value;

second specifying processing of specifying a color combination included in the first image data, corresponding to the color combination specified by the first specifying processing; and correcting the first conversion data to the second conversion data with respect to the color combination specified by the second specifying processing such that a color difference of the color combination included in the second output data is greater than a color difference of the color combination specified by the first specifying processing.

22. An image processing method comprising:

generating image data having undergone color gamut conversion from input image data using conversion data for converting from a color gamut of the input image data into a color gamut of an output; and correcting first conversion data to second conversion data based on a result of the color gamut conversion of using the first conversion data, wherein the generation unit further generates the image data having undergone the color gamut conversion using the second conversion data, first output data generated as a result of the color gamut conversion using the first conversion data from first image data including a first color and a second color includes a third color corresponding to the first color and a fourth color corresponding to the second color, second output data generated as a result of the color gamut conversion using the second conversion data from the first image data includes a fifth color corresponding to the first color and a sixth color corresponding to the second color, and a second color difference corresponding to a distance between the fifth color and the sixth color is greater than a first color difference corresponding to a distance between the third color and the fourth color.

23. A non-transitory computer-readable storage medium storing a program configured to cause a computer of an information processing apparatus to function as:

a generation unit configured to generate image data having undergone color gamut conversion from input image data using conversion data for converting from a color gamut of the input image data into a color gamut of an output device; and a correction unit configured to correct first conversion data to second conversion data based on a result of the color gamut conversion of using the first conversion data by the generation unit, wherein the generation unit further generates the image data having undergone the color gamut conversion using the second conversion data, first output data generated as a result of the color gamut conversion using the first conversion data from first image data including a first color and a second color includes a third color corresponding to the first color and a fourth color corresponding to the second color, second output data generated as a result of the color gamut conversion using the second conversion data from the first image data includes a fifth color corresponding to the first color and a sixth color corresponding to the second color, and a second color difference corresponding to a distance between the fifth color and the sixth color is greater than a first color difference corresponding to a distance between the third color and the fourth color.

24. An image processing apparatus comprising:

one or more circuits; or one or more processors and at least one memory, the at least one memory being coupled to the one or more processors and having stored thereon instructions executable by the one or more processors, wherein at least one of the one or more circuits or the execution of the instructions cause the image processing apparatus to function as:

a generation unit configured to generate image data having undergone color gamut conversion from input image data using conversion data for converting from a color gamut of the input image data into a color gamut of an output device; and a correction unit configured to correct first conversion data to second conversion data based on a result of the color gamut conversion of using the first conversion data by the generation unit, wherein, in the image data corrected by the correction unit, a color difference in the image data having undergone the color gamut conversion by the conversion unit is expanded.

* * * * *